(12) United States Patent
Shirota et al.

(10) Patent No.: US 7,470,733 B2
(45) Date of Patent: Dec. 30, 2008

(54) ADDITIVE FOR HYDRAULIC COMPOSITIONS

(75) Inventors: Kyoichi Shirota, Wakayama (JP);
Masaaki Shimoda, Wakayama (JP);
Yoshiaki Tanisho, Wakayama (JP);
Yoshikazu Morii, Wakayama (JP);
Masayoshi Ehara, Wakayama (JP);
Toshimasa Hamai, Wakayama (JP);
Daisuke Hamada, Wakayama (JP)

(73) Assignee: Kao Corporation, Tokyo (JP)

( * ) Notice: Subject to any disclaimer, the term of this patent is extended or adjusted under 35 U.S.C. 154(b) by 360 days.

(21) Appl. No.: 10/542,020

(22) PCT Filed: Jan. 22, 2004

(86) PCT No.: PCT/JP2004/000552

§ 371 (c)(1),
(2), (4) Date: Feb. 17, 2006

(87) PCT Pub. No.: WO2004/065318

PCT Pub. Date: Aug. 5, 2004

(65) Prior Publication Data

US 2006/0235112 A1    Oct. 19, 2006

(30) Foreign Application Priority Data

Jan. 23, 2003 (JP) ............... 2003-014812
Jun. 13, 2003 (JP) ............... 2003-169597
Jun. 30, 2003 (JP) ............... 2003-189012

(51) Int. Cl.
*C04B 40/00* (2006.01)
*C04B 24/26* (2006.01)
*C08K 5/521* (2006.01)

(52) U.S. Cl. ............ 524/2; 524/136; 524/151; 524/152; 106/819

(58) Field of Classification Search ............... 106/819; 524/136, 151, 152, 2
See application file for complete search history.

(56) References Cited

U.S. PATENT DOCUMENTS

| | | | | |
|---|---|---|---|---|
| 3,004,056 A | * | 10/1961 | Hesse et al. | 558/114 |
| 3,004,057 A | * | 10/1961 | Nunn, Jr. | 558/114 |
| 3,532,632 A | * | 10/1970 | Sugarman et al. | 252/75 |
| 4,151,099 A | * | 4/1979 | Nassry et al. | 508/250 |
| 4,428,860 A | * | 1/1984 | Panek et al. | 516/9 |
| 4,479,893 A | * | 10/1984 | Hirota et al. | 510/122 |
| 4,808,641 A | | 2/1989 | Yagi et al. | |
| 5,415,793 A | * | 5/1995 | Nassry et al. | 508/377 |
| 5,707,445 A | * | 1/1998 | Yamato et al. | 106/802 |
| 5,879,445 A | | 3/1999 | Guicquero et al. | |
| 6,239,241 B1 | * | 5/2001 | Yamato et al. | 526/318.44 |

FOREIGN PATENT DOCUMENTS

| JP | 1-219050 A | 9/1989 |
|---|---|---|
| JP | 2508113 B2 | 4/1996 |
| JP | 2002-121058 A | 4/2002 |

* cited by examiner

*Primary Examiner*—D. Lawrence Tarazano
*Assistant Examiner*—John Uselding
(74) *Attorney, Agent, or Firm*—Birch, Stewart, Kolasch & Birch, LLP

(57) ABSTRACT

The invention provides an additive for hydraulic compositions, which exhibits an excellent viscosity reducing effect on a hydraulic composition, for example, a hydraulic composition containing a slurry of water and hydraulic powder, and is excellent in operativeness when used as an aqueous solution. The additive for hydraulic compositions contains a phosphoric monoester having a specific group such as an alkyl ether group or a salt thereof (monoester) and a phosphoric diester having a specific group such as an alkyl ether group or a salt thereof (diester) in a monoester weight content of monoester/(monoester+diester) is 0.4 to 0.95 (diester includes a pyrodiester).

10 Claims, 3 Drawing Sheets

ADDITIVE FOR HYDRAULIC COMPOSITIONS

FIELD OF THE INVENTION

The present invention relates to an additive for hydraulic compositions containing cement.

BACKGROUND OF THE INVENTION

In recent years, there is an increasing demand for highly durable concrete whose strength is highly increased, for example, by reducing a water content used in the concrete, and this tendency will further increase in the future. For reducing the water content, a polycarboxylic acid-based water reducing agent excellent in water reducing properties and flow retention is used. As the water content is reduced, however, fresh concrete viscosity (also referred to hereinafter as concrete viscosity) is increased which causes the problem of deterioration in workability and operativeness in delivery by pressurization with a pump, in placing, or in compacting into a form. This problem of increased viscosity cannot sufficiently be solved by the polycarboxylic acid-based water reducing agent, and there is a need for additives having higher effects on reduction of concrete viscosity.

On one hand, techniques wherein a phosphate-based additive is used as an additive for hydraulic compositions are disclosed. For example, JP-B 2508113 discloses a technique of using an additive composition containing a specific polycarboxylic acid-based cement dispersant, a specific nonionic compound, and a polyoxyalkylene alkyl ether phosphate as one compound selected from compounds used as air entraining agents. JP-A 1-219050 discloses a composition containing a phosphate of specific structure as a cement dispersant and a specific nonionic surfactant.

JP-A 2002-121058 discloses an admixture containing a polyoxyalkylene alkyl ether phosphate and a polymer obtained by polymerizing a monomer having a specific polyoxyalkylene group.

SUMMARY OF THE INVENTION

The present invention relates to an additive for hydraulic compositions containing a phosphoric monoester having a group represented by general formula (1) below or a salt thereof (referred to hereinafter as the monoester) and a phosphoric diester (including a pyrophosphoric diester) having a group represented by general formula (1) below or a salt thereof (referred to hereinafter as the diester) [hereinafter, the monoester and diester are referred to collectively as component (A)]:

$$R^1-O(AO)_n- \quad (1)$$

wherein $R^1$ represents a C8 to C22 alkyl or alkenyl group or a hydrocarbon group having two or more benzene rings, AO represents a C2 to C4 oxyalkylene group, and n is a number of 1 to 50 as the average added mole number, wherein the monoester weight content of (A) in terms of monoester/(monoester+diester) ranges from 0.4 to 0.95.

Further, the present invention also relates to a hydraulic composition containing the additive for hydraulic compositions according to the present invention, hydraulic powder and water, and to a set product obtained from the hydraulic composition.

The invention further relates to use of the additive described above for an additive to a hydraulic composition and a method of dispersing a hydraulic composition by adding the additive described above to a hydraulic composition.

Figure 1:
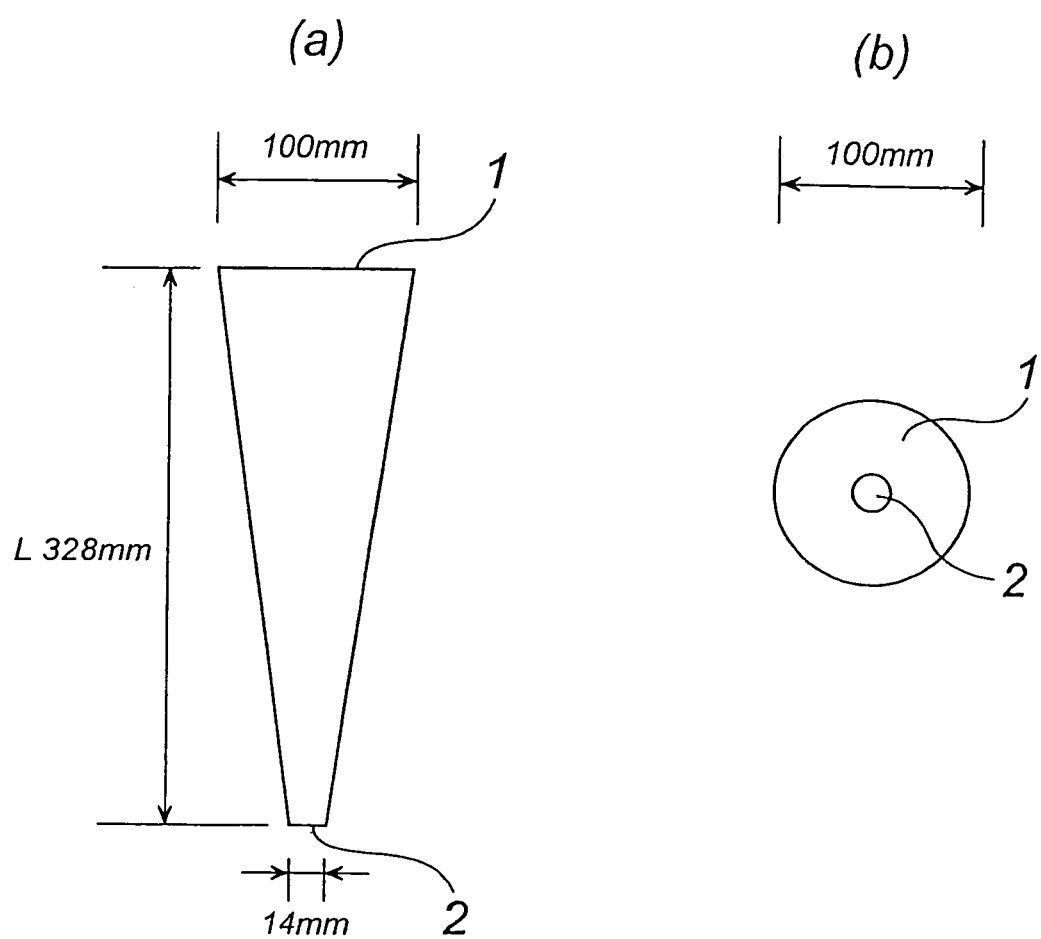
FIG. 1 is an illustration of a device used in measuring dropping time in Examples.

Numeral references of the drawings are:
1: an upper charge opening
2: a lower discharge opening

DETAILED DESCRIPTION OF THE INVENTION

JP-B 2508113 does not completely satisfy the demand for the viscosity reducing effect on hydraulic compositions. When a solution containing a phosphate and a surfactant at a practically desired concentration of 20 wt % or more in total is prepared by using the technique of JP-A 1-219050, the resulting solution has higher viscosity or is not uniform, and thus this solution when added to hydraulic compositions is hardly handled. In JP-A 2002-121058 a further improvement in decreased viscosity of a hydraulic composition is desired. When the conventional phosphate and surfactant are used as a dispersant for a hydraulic composition, the amount of entrained air in the hydraulic composition becomes instable and excessive air remains to cause a reduction in the strength of the hydraulic composition after setting, and thus it is also desired to confer stability on entrained air.

The present invention relates to an additive for hydraulic compositions which is excellent in performance which exhibits an excellent viscosity reducing effect and flow (also referred to hereinafter as a "fresh state") for a hydraulic composition, particularly a hydraulic composition containing a slurry of water and hydraulic powder. The additive forms an aqueous solution having such suitable viscosity and uniformity such that the solution can be well added to a hydraulic composition to achieve a fresh state of the hydraulic composition and is also excellent in the effect of imparting stability to entrained air.

Embodiment I

Phosphoric acid is usually a generic name of acids produced with hydration of diphosphorus pentoxide, including methaphosphoric acid, pyrophosphoric acid, orthophosphoric acid, triphosphoric acid, tetraphosphoric acid and the like. As component (A) of the invention, preferably used is a mixture (A') of (A1) an orthophosphoric monoester having a group represented by general formula (1) above or a salt thereof (monoester), (A2) an orthophosphoric diester having a group represented by general formula (1) above or a salt thereof, and a pyrophosphoric diester having a group represented by general formula (1) above or a salt thereof (diester). That is, it is preferable in the invention that of the monoester of component (A) is an orthophosphoric monoester having a group represented by general formula (1) above or a salt thereof and the diester of component (A) is an orthophosphoric diester having a group represented by general formula (1) above or a salt thereof and a pyrophosphoric diester having a group represented by general formula (1) above or a salt thereof. The below shown description of (A) can be applied also to (A') unless specially mentioned.

By using the component (A) in the additive for hydraulic compositions according to the invention, the resulting additive is excellent in the fresh state of a hydraulic composition such as concrete and superior in product stability. Hereinafter, the additive for hydraulic compositions according to the invention wherein only the component (A) is used (that is, the substantial active ingredient is only the component (A)) will be described as Embodiment I.

The component (A) has a group represented by the general formula (1) above. In the general formula, $R^1$ represents an alkyl or alkenyl group containing 8 to 22 carbon atoms, preferably 10 to 20 carbon atoms, or a hydrocarbon group having two or more benzene rings. The component (A) includes an alkyl ether phosphoric monoester having an alkyl ether group or a salt thereof, an alkenyl ether phosphoric monoester having an alkenyl ether group or a salt thereof, and an aryl ether phosphoric monoester having an aryl ether group having two or more benzene rings or a salt thereof. It is preferable from the viewpoint of the state of an aqueous solution of the present additive (viscosity and uniformity of the aqueous solution) that the number of carbon atoms in the alkyl group is 12 to 16, the number of carbon atoms in the alkenyl group is 16 to 20, and the number of total carbon atoms in the hydrocarbon group having two or more benzene rings is 13 to 38. The alkyl or alkenyl group is particularly preferably a myristyl or oleyl group, and the hydrocarbon group having two or more benzene rings is particularly preferably the one containing 20 to 30 carbon atoms in total. The hydrocarbon group having two or more benzene rings is preferably an aryl group substituted with a substituent group containing one or more benzene rings, more preferably an aryl group substituted with a substituent group containing two or three benzene rings. From the viewpoint of the stability of air entrained in the hydraulic composition, it preferably has a hydrocarbon group having two or more benzene rings. Further, AO is a C2 to C4 oxyalkylene group such as an oxyethylene group, oxypropylene group and oxybutylene group, preferably an oxyethylene group and oxypropylene group, wherein the proportion of oxyethylene groups in the polyoxyalkylene group is preferably 50 mol-% or more, more preferably 70 mol-% or more, still more preferably 100 mol-%, from the viewpoint of water solubility. n is the average added mole number, which is a number of 1 to 50, and when only the component (A) is used, n is preferably a number of 3 to 35, more preferably 5 to 20, from the viewpoint of reducing viscosity. When only the component (A) is used, n is preferably 10 to 25, more preferably 10 to 22, even more preferably 15 to 20, from the viewpoint of the flow of the hydraulic composition. The structure of the general formula (1) is important, and when the number of carbon atoms in $R^1$ and the type of $R^1$ are described above and n is in the above range, the hydraulic composition can be endowed with an excellent effect of reducing viscosity and an effect of conferring suitable flow. For example, when $R^1$ is an alkenyl group and n is less than 5, the amount of the component (A) necessary for achieving the same flow of the hydraulic composition tends to be increased. From this viewpoint, n is preferably 5 or more.

The salt of the component (A) is preferably, for example, an alkali metal salt, an alkaline earth metal salt, an ammonium salt or an amine salt, more preferably an alkali metal salt or a hydroxyl-substituted alkylamine salt, even more preferably a potassium salt, a sodium salt or a triethanolamine salt, even more preferably a sodium salt or a potassium salt from the viewpoint of the state of the aqueous solution, even more preferably a potassium salt.

As the component (A), the monoester and diester preferably have structures represented by general formula (1-1):

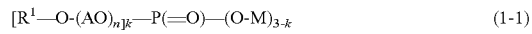

$$[R^1\text{—O-}(AO)_n]_k\text{—P}(=O)\text{—}(O\text{-M})_{3-k} \quad (1\text{-}1)$$

wherein $R^1$ represents a C8 to C22 alkyl or alkenyl group or a hydrocarbon group having two or more benzene rings, AO represents a C2 to C4 oxyalkylene group, n is an average added mole number of 1 to 50, k is 1 or 2, and M represents a hydrogen atom, an alkali metal, an alkaline earth metal, an ammonium group, an alkyl ammonium group or a hydroxyl-substituted alkyl ammonium group.

In the general formula (1-1), two M groups when k is 1 or two $R^1$ groups or n when k is 2 may be the same or different.

The component (A) is a phosphoric monoester or diester having a phosphorus atom-bonding group represented by the general formula (1) or a salt thereof. From the viewpoint of the state of the present additive in the form of an aqueous solution, the monoester weight content (diester including a pyrophosphoric diester) is 0.4 to 0.95 in terms of monoester/(monoester+diester), and when n is less than 10, the ratio is preferably 0.4 to 0.85, more preferably 0.4 to 0.65, from the viewpoint of the flow of the hydraulic composition. When n is 10 or more, the ratio is preferably 0.5 to 0.95, more preferably 0.65 to 0.95, even more preferably 0.7 to 0.95, from the viewpoint of the flow of the hydraulic composition and the state of the aqueous solution, further even more preferably 0.7 to 0.85 from the viewpoint of easiness of industrial production.

The monoester weight content of monoester/(monoester+diester) of the invention can be determined in the following manner.

(Method of Calculating a Monoester Ratio)

Amounts of phosphoric monoester and phosphoric diester (including pyrophosphoric diester), contained in component (A), are determined and calculated according to $^{31}$P-NMR determination (with trimethylphosphate as an internal standard). UNITY INOVA 300, manufactured by VARIAN Inc., is used as an apparatus and conditions are a pulse width of 90° pulse (17.2 μs) and a waiting time of 30 s (not longer than 5 times as long as t1). In order to improve the spectrum resolution, a pre-treatment is preferably carried out by adding a heavy methanol in an amount of 2 volumes per 1 volume of a sample of a 20 wt. % aqueous solution and then adding a 20 wt. % aqueous solution of potassium hydroxide including potassium hydroxide in an amount being equivalent to a neutralization degree of 1.0 to an acid value of 3 of the above determined sample. The molecular weight of polyoxyalkylene alkyl ether is determined from a hydroxy value.

The monoester weight contents calculated by the above shown NMR method and the calculation method (a) below described in Example are each the weight ratio of monoester/(monoester+diester).

From the comprehensive viewpoint of the state of the aqueous solution of the additive and the flow of the hydraulic composition according to the invention, the number (x) of carbon atoms in the alkyl group represented by $R^1$, the number (y) of carbon atoms in the alkenyl group represented by $R^1$, the number (n) of AO molecules added, and the ratio (z) by weight of the monoester/(monoester+diester) in Embodiment I are preferably as follows:

(I) When n is less than 10,
(I-1) In the case where $R^1$ is an alkyl group,
preferably x=10 to 22, n=3 to 9, and z=0.4 to 0.95,
more preferably x=10 to 22, n=3 to 9, and z=0.4 to 0.85,
even more preferably x=10 to 22, n=3 to 9, and z=0.4 to 0.65, (I-2) In the case where $R^1$ is an alkenyl group,
preferably y=10 to 22, n=3 to 9, and z=0.4 to 0.95,
more preferably y=12 to 18, n=3 to 9, and z=0.4 to 0.95,
even more preferably y=12 to 18, n=5 to 9, and z=0.4 to 0.85,
further even more preferably y=12 to 18, n=5 to 9, and z=0.4 to 0.65,
further even more preferably y=16 to 18, n=5 to 9, and z=0.4 to 0.65,
further even more preferably y=18, n=5 to 9, and z=0.4 to 0.65.

(II) When is 10 or more,
preferably x=10 to 22 or y=10 to 22, n=10 to 35, and z=0.5 to 0.95,
more preferably x=10 to 20 or y=12 to 20, n=10 to 30, and z=0.65 to 0.95,
even more preferably x=12 to 18 or y=14 to 18, n=10 to 20, and z=0.7 to 0.95,
further even more preferably x=14 to 18 or y=16 to 18, n=10 to 20, and z=0.7 to 0.95,
further even more preferably x=14 or y=18, n=15 to 20, and z=0.70 to 0.85.

From the viewpoint of the flow of the hydraulic composition, n is preferably 10 or more.

The additive for hydraulic compositions according to the present invention may contain a phosphoric triester having a group represented by the general formula (1) (referred to hereinafter as the triester) besides the component (A) (monoester and diester). Insofar as the component (A) satisfies the monoester/diester ratio defined above and the content thereof in the additive for hydraulic compositions according to the invention, the ratio and amount of the triester are not particularly limited, but the (monoester+diester)/(monoester+diester+triester) ratio by weight is preferably 0.7 or more, more preferably 0.8 or more.

It is important for the component (A) to satisfy the weight content defined above, and $R^1$, AO or n in the monoester, diester and further triester may be the same or different.

The component (A) can be obtained, for example, by adding an alkylene oxide to an alcohol and then phosphorylating the product. When an alkylene oxide is added to a low-boiling alcohol, it is desired to select a catalyst capable of reducing water generated. Using a commercial alcohol/alkylene oxide adduct as the starting material, the component (A) can also be obtained by phosphorylation reaction. The alcohol may be a naturally occurring alcohol or a synthetic alcohol. The alkylene oxide includes C2 to C4 alkylene oxides such as ethylene oxide (referred to hereinafter as EO), propylene oxide (referred to hereinafter as PO) and butylene oxide (referred to hereinafter as BO). It is preferable to use EO or a combination of EO and PO, more preferably EO.

The phosphorylation reaction can be carried out by a general method. The component (A) can be produced, for example, not only by a method of using anhydrous phosphoric acid but also by a method of using anhydrous phosphoric acid and an aqueous solution of phosphoric acid, anhydrous phosphoric acid and water, phosphorus oxychloride, or polyphosphoric acid. In the present invention, the proportion of the monoester in the component (A) may be regulated by regulating the ratio of polyoxyalkylene alkyl ether to a phosphorylating agent and the reaction time, by hydrolysis reaction, by purification techniques such as crystallization, distillation, etc., or by separate addition.

When (A) is (A'), in particular, hydrolysis reaction is particularly effective in increasing the proportion of the monoester in the component (A') because 1 mole of the monoester is formed as the component (A') from 1 mole of pyrophosphoric monoester, and 2 moles of the monoester are formed as the component (A') from 1 mole of pyrophosphoric diester.

Polyoxyalkylene alkyl ether having a narrow molecular-weight distribution range (narrowed ethoxylate) produced by using an alkaline earth metal hydroxide catalyst, an acid catalyst such as boron trifluoride, and a catalyst containing hydrotalcites or a composite oxide of Zn, Al or Mg can also be used, and is preferable from the viewpoint of the flow of the hydraulic composition.

Embodiment II

To improve flow, the additive for hydraulic compositions according to the invention more preferably contains not only the component (A) but also at least one compound (B) selected from (B1) a nonionic compound having a C8 to C26 alkyl or alkenyl group or a C6 to C35 hydrocarbon group having one or more benzene rings and a polyoxyalkylene group containing a C2 to C4 oxyalkylene group wherein the average added mole number of oxyalkylene is 3 to 400 [referred to hereinafter as component (B1)] and (B2) an ionic compound composed of a C8 to C26 alkyl or alkenyl group or a C6 to C35 hydrocarbon group having one or more benzene rings and a polyoxyalkylene group containing a C2 to C4 oxyalkylene group wherein the average added mole number of oxyalkylene groups [referred to hereinafter as component (B2)], the component (B2) excluding a phosphate having a group represented by the general formula (1) or a salt thereof. The component (B) preferably has one or two polyoxyalkylene groups. Hereinafter, the additive for hydraulic compositions according to the invention wherein the components (A) and (B) are simultaneously used (that is, the substantial active ingredient is the components (A) and (B)) will be described as Embodiment II.

In the component (B), the component (B1) includes at least one compound selected from the group consisting of a compound represented by the general formula (2) below, a compound represented by the general formula (3) below and a compound represented by the general formula (4) below, polyoxyalkylene sorbitan alkyl ester, polyoxyalkylene glycerin alkyl ester, polyoxyalkylene hardened castor oil, etc., and from the viewpoint of the viscosity of the aqueous solution in Embodiment II, the component (B1) is preferably at least one compound selected from the group consisting of a compound represented by the general formula (2), a compound represented by the general formula (3) and a compound represented by the general formula (4). In the case where the components (A) and (B) are simultaneously used, it is preferable from the viewpoint of the stability of entrained air that the component (B) having a C6 to C35 hydrocarbon group having one or more benzene rings is used when the component (A) of the general formula (1) wherein $R^1$ is a hydrocarbon group having two or more benzene rings is used.

$$R^2\text{—O-}(AO)_p\text{—R} \qquad (2)$$

$$R^3\text{—COO-}(AO)_q\text{—}R^4 \qquad (3)$$

$$R^5\text{—NH}_{(2-t)}[(AO)_s\text{—H}]_t \qquad (4)$$

wherein $R^2$, $R^3$ and $R^5$ each represent a C8 to C26 alkyl or alkenyl group or a C6 to C35 hydrocarbon group having one or more benzene rings, R and $R^4$ each represent a hydrogen atom, a C1 to C26 alkyl or alkenyl group or a C6 to C35 hydrocarbon group having one or more benzene rings, preferably a hydrogen atom, AO represents a C2 to C4 oxyalkylene group, p, q and s each represent an average added mole number of 3 to 400, preferably 5 to 200, even more preferably 8 to 150, t is 1 or 2, and when t is 2, two $(AO)_s$ may be different.

The nonionic compound of the general formula (2) is obtained by adding, to an alcohol having the $R^2$ group, an alkylene oxide selected from EO, PO and BO, preferably EO or combined EO and PO, more preferably EO. Similarly, the nonionic compound of the general formula (3) or (4) is obtained by adding an alkylene oxide selected from EO, PO and BO, preferably EO or EO and PO, to the compound having the $R^3$ or $R^5$ group. From the viewpoint of the state of the aqueous solution, EO is used in an amount of 50 mol-% or more, more preferably 70 mol-% or more, even more preferably 100 mol-%, in the alkylene oxide to be added. The component (B1) is particularly preferably the nonionic compound of the general formula (2). It is preferable that from the viewpoint of the stability of entrained air that the polyoxyalkylene group further contains an oxypropylene group, and the ratio of an oxyethylene group in the polyoxyalkylene group is preferably 10 mol-% or more, more preferably 25-mol-% or more. From the overall viewpoint of water solubility and the stability of entrained air, the molar ratio of oxyethylene group/oxypropylene group is preferably 90/10 to 30/70, more preferably 80/20 to 40/60. The form of addition of two or more kinds of alkylene oxides may be in a block form, a random form or a mixture thereof.

In the general formulae (2) to (4), each of $R^2$, $R^3$ and $R^5$ is preferably a C10 to C22, more preferably C14 to C20, even more preferably C14 to C18 linear alkyl or alkenyl group, even more preferably an oleyl group. When each of $R^2$, $R^3$ and $R^5$ is a C6 to C35 hydrocarbon group having one or more benzene rings, the hydrocarbon group is preferably a group having two or more benzene rings (particularly an aryl group substituted with a substituent group having one or more benzene rings), more preferably a hydrocarbon group having 3 or 4 benzene rings (particularly an aryl group substituted with a substituent group containing 2 or 3 benzene rings), and the number of total carbon atoms therein is preferably 20 to 30. Each of R and $R^4$ is preferably a hydrogen atom, a C1 to C26 alkyl or alkenyl group or a C6 to C35 hydrocarbon group having one or more benzene rings, preferably a hydrogen atom, a C1 to C8 alkyl group or a C2 to C8 alkenyl group, even more preferably a hydrogen atom, a C1 to C4 alkyl group or a C2 to C4 alkenyl group, even more preferably a hydrogen atom, a C1 to C2 alkyl group or a C2 alkenyl group.

In the component (B1), the nonionic compound of the general formula (2) is preferably polyoxyalkylene alkyl ether, polyoxyalkylene alkyl phenyl ether, polyoxyalkylene polystyrenated phenyl ether or polyoxyalkylene polybenzylated phenyl ether, more preferably polyoxyalkylene(di or tri)styrenated phenyl ether or polyoxyalkylene(di or tri)benzylated phenyl ether, the nonionic compound of the general formula (3) includes polyoxyalkylene alkyl ester and alkoxypolyoxyalkylene alkyl ester, and the nonionic compound of the general formula (4) includes polyoxyalkylene alkyl amine etc. A compound having a hydrophobic group such as organosiloxane, for example a silicone-based surfactant, in the place of the specific alkyl group, alkenyl group and C6 to C35 hydrocarbon group having one or more benzene rings in the component (B1) can also be used. It is more preferable from the viewpoint of the state of the aqueous solution that as the component (B1), the nonionic compound of the general formula (2) is polyoxyalkylene alkyl ether, the nonionic compound of the general formula (3) is polyoxyalkylene alkyl ester, and the nonionic compound of the general formula (4) is polyoxyalkylene alkyl amine.

The component (B2) is preferably polyoxyalkylene alkyl ether sulfate or polyoxyalkylene alkyl ether carboxylate. The structure of the polyoxyalkylene moiety thereof (number of carbon atoms, average number of units added, etc.), the number of carbon atoms in the alkyl group, etc. are identical with those described in the component (B1).

From the viewpoint of the state of the aqueous solution, (B1) is more preferable than (B2).

For further allowing the component (A) to exhibit improvements in the flow of a hydraulic composition in Embodiment II wherein the components (A) and (B) are simultaneously used, the monoester/(monoester+diester) ratio by weight is preferably 0.5 to 0.95, more preferably 0.7 to 0.95 from the viewpoint of both the state of the aqueous solution and the flow of the hydraulic composition, further even more preferably 0.7 to 0.85 from the viewpoint of easiness of industrial production. When the monoester/(monoester+diester) ratio by weight is less than 0.4, the resulting additive is not preferable in respect of the viscosity reducing effect and the state of the aqueous solution (viscosity and uniformity of an aqueous solution of the additive).

In Embodiment II wherein the components (A) and (B) are simultaneously used, n is preferably 5 to 25, more preferably 8 to 20, even more preferably 8 to 15, so that the component (A) exhibits further improvements in the flow of the hydraulic composition.

From the overall viewpoint of the state of an aqueous solution of the additive of the invention, the flow of the hydraulic composition and the easiness of industrial production, the number (x1) of carbon atoms in the alkyl group represented by $R^1$, the number (y1) of carbon atoms in the alkenyl group represented by $R^1$, the number (n1) of AO molecules added, and the ratio (z1) by weight of the monoester/(monoester+diester) in the component (A) in Embodiment II are as follows:

(1-1) preferably x1=10 to 22 or y1=10 to 22, n1=3 to 35, and z1=0.50 to 0.95, (1-2) more preferably x1=10 to 20 or y1=12 to 20, n1=5 to 25, and z1=0.70 to 0.95, (1-3) even more preferably x1=12 to 18 or y1=14 to 18, n1=5 to 25, and z1=0.70 to 0.95, (1-4) further even more preferably x1=14 to 18 or y1=16 to 18, n1=8 to 20, and z1=0.70 to 0.85, (1-5) further even more preferably x1=14 or y1=18, n1=10 to 15, and z1=0.70 to 0.85.

From the viewpoint of the flow of the hydraulic composition, the number (x2) of carbon atoms in the alkyl group represented or C6 to C35 hydrocarbon group having one or more benzene rings, represented by $R^2$, $R^3$ and $R^5$, the number (y2) of carbon atoms in the alkenyl group represented by $R^2$, $R^3$ and $R^5$, and the number (n2) of AO molecules added in the component (B), particularly the nonionic compound of general formula (2) to (4) as the component (B1) in Embodiment II are as follows:

preferably x2=12 to 22, y2=16 or 18, or n2=8 to 370, more preferably x2=14 to 22, y2=18, or n2=8 to 200.

From the viewpoint of reducing the viscosity of the hydraulic composition, the (A)/(B) ratio by weight is preferably 99/1 to 10/90, more preferably 90/10 to 30/70, even more preferably 80/20 to 45/55.

Embodiment III

From the viewpoint of improvements in the flow retention of the hydraulic composition, the additive for hydraulic compositions according to the invention preferably contains a copolymer (C) [referred to hereinafter as component (C)]

having at least one kind of structural unit selected from a structural unit derived from a monomer represented by the general formula (5), a structural unit derived from a monomer represented by the general formula (6) and a structural unit derived from a monomer represented by the general formula (7), in addition to the components (A) and (B). Hereinafter, the additive for hydraulic compositions according to the invention wherein the components (A), (B) and (C) are simultaneously used (the substantial active ingredient is the components (A), (B) and (C)) will be described as Embodiment III.

The component (C) includes a copolymer obtained by polymerizing a monomer represented by the general formula (5) with one or more monomers selected from monomers represented by the general formulae (6) and (7). The monomer represented by the general formula (5) is preferably an ethylenically unsaturated carboxylate containing an oxyalkylene group or a polyoxyalkylene group having the average added mole number of 1 to 300. The oxyalkylene group may be an oxystyrene group, and the polyoxyalkylene group may contain an oxystyrene group or may be a polyoxystyrene group. The monomer represented by the general formula (5), the monomer represented by the general formula (6) or the monomer represented by the general formula (7) may be two or more kinds of monomers.

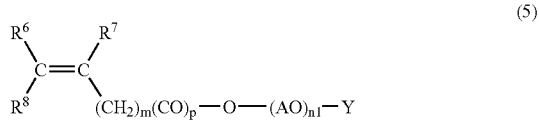

(5)

wherein:

$R^6$, $R^7$: a hydrogen atom or a methyl group, m: a number of 0 to 2, $R^8$: a hydrogen atom or $-COO(AO)_{n1}Y$, p: a number of 0 or 1.

AO: a C2 to C4 oxyalkylene group or an oxystyrene group, n1: a number of 1 to 300 that is the average added mole number, Y: a hydrogen atom or a C1 to C18 alkyl or alkenyl group.

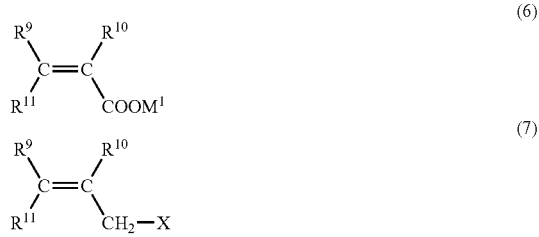

(6)

(7)

wherein:

$R^9$ to $R^{11}$: a hydrogen atom, a methyl group or $-(CH_2)_{m1}COOM^2$, which may form anhydride together with $-COOM^1$ or another $-(CH_2)_{m1}COOM^2$, where $M^1$ and $M^2$ are not present, $M^1$, $M^2$: a hydrogen atom, an alkali metal, an alkaline earth metal, an ammonium group, an alkyl ammonium group or a hydroxyl-substituted alkyl ammonium group, m1: a number of 0 to 2.

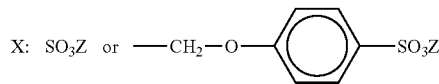

Z: a hydrogen atom, an alkali metal, an alkaline earth metal, an ammonium group, an alkyl ammonium group or a hydroxyl-substituted alkyl ammonium group.

The monomer represented by the general formula (5) is preferably a (half)ester of methacrylic acid or maleic acid or an ether of (meth)allyl alcohol, with polyalkylene glycol terminated with an alkyl group at one terminal, such as methoxy polyethylene glycol, methoxy polypropylene glycol, methoxy polybutylene glycol, methoxy polystyrene glycol or ethoxy polyethylene polypropylene glycol, and a (meth) acrylic acid, maleic acid or (meth)allyl alcohol/EO or PO adduct, $R^8$ is preferably a hydrogen atom, m is preferably 0 and p is preferably 1. The monomer of the general formula (5) is more preferably an ester of alkoxy, particularly methoxy polyethylene glycol with (meth)acrylic acid, even more preferably an ester of methoxy polyethylene glycol with methacrylic acid. The monomer may be esterified directly or after copolymerization of the monomer of the general formula (6) and/or the monomer of the general formula (7). The average number of moles (n1) of alkylene oxides added is in the range of 1 to 300 for excellent flow and flow retention, more preferably in the range of 8 to 200, particularly 20 to 150. Y is preferably a C1 to C4 alkyl or alkenyl group, more preferably a methyl group. The alkylene oxide is preferably EO or EO and PO, more preferably EO.

The monomer represented by the general formula (6) is preferably an unsaturated monocarboxylic acid monomer such as (meth)acrylic acid, crotonic acid etc., an unsaturated dicarboxylic acid monomer such as maleic acid, itaconic acid, fumaric acid, etc., or salts thereof, for example an alkali metal salt, an alkaline earth metal salt, an ammonium salt and an amine salt, preferably (meth) acrylic acid or an alkali metal salt thereof, more preferably methacrylic acid or an alkali metal salt thereof, even more preferably methacrylic acid or a sodium salt thereof. The monomer represented by the general formula (7) includes (meth)allylsulfonic acid or salts thereof, for example, an alkali metal salt, an alkaline earth metal salt, an ammonium salt and an amine salt, more preferably methaarylsulfonic acid or a sodium salt thereof.

The weight average molecular weight of the copolymer as component (C) [determined using polyethylene glycol standards in gel permeation chromatography with columns G4000 PWXL+G2500 PWXL (Tosoh) and eluent 0.2 M phosphate buffer/acetonitrile=7/3 (ratio by volume)] is preferably in the range of 1,000 to 200,000, more preferably 15,000 to 100,000 from the viewpoint of sufficient flow and flow retention of hydraulic powder.

The component (C) is produced preferably by using a monomer (5) represented by the general formula (5), a monomer (6) represented by the general formula (6) and a monomer (7) represented by the general formula (7) in a molar ratio of (5)/[(6)+(7)] in the range of 99/1 to 1/99, preferably 60/40 to 1/99, more preferably 40/60 to 5/95. The molar ratio [(6)/(7)] of the monomer represented by the general formula (6) to the monomer represented by the general formula (7) is preferably 100/0 to 80/20, more preferably 100/0 to 90/10.

The component (C) may be used in combination with copolymerizable monomers such as acrylonitrile, (meth) acrylamide, styrene, alkyl(meth)acrylate (containing 1 to 12 carbon atoms, which may have a hydroxyl group) and styrenesulfonic acid. These monomers can be used in an amount of not higher than 50% by weight, particularly not higher than 30% by weight, based on the total monomers, but 0% by weight is preferable.

The copolymer as the component (C) can be produced in a known method. For example, a solution polymerization method in JP-A 11-157897 can be mentioned, and the monomers may be reacted at 50 to 100° C. for 0.5 to 10 hours in the presence of a polymerization initiator such as ammonium persulfate, hydrogen peroxide, etc. in water or a C1 to C4 lower alcohol, if necessary after addition of sodium sulfite, mercaptoethanol etc.

In consideration of the type of the hydraulic powder and the use of the hydraulic composition, two or more copolymers may be used as the component (C).

Concrete examples of the components (A) and (B), the range of the monoester/(monoester+diester) ratio by weight and the range of the (A)/(B) ratio by weight in Embodiment III can be suitably selected from those in Embodiment I or II.

In respect of flow retention, the ratio of the component (A)/component (C) is preferably 99/1 to 10/90, more preferably 90/10 to 30/70, even more preferably 80/20 to 45/55.

<Additive for Hydraulic Compositions>

The present additive for hydraulic compositions in Embodiments I to III can be used as a dispersant or a flow promoter to reduce the weight of water, or as a viscosity reducing agent to exhibit a viscosity reducing effect.

It is preferable for the viscosity reducing effect that the present additive for hydraulic compositions in Embodiments I to III is used such that the amount of the component (A) is 0.01 to 7.5 parts by weight, preferably 0.05 to 5 parts by weight, more preferably 0.08 to 2 parts by weight, based on 100 parts by weight of hydraulic powder.

Further, for the viscosity reducing effect, it is preferable that the component (B) is used in an amount of 0.01 to 7.5 parts by weight, more preferably 0.05 to 5 parts by weight, even more preferably 0.05 to 2 parts by weight, based on 100 parts by weight of hydraulic powder.

For the flow keeping effect, it is preferable that the component (C) is used in an amount of 0.01 to 5 parts by weight, more preferably 0.05 to 2 parts by weight, even more preferably 0.05 to 1 part by weight, based on 100 parts by weight of hydraulic powder.

For the viscosity reducing effect, it is preferable that the component (A)/component (B) ratio by weight is 99/1 to 10/90, more preferably 90/10 to 30/70, even more preferably 80/20 to 45/55.

From the viewpoint of the state of the aqueous solution, it is preferable that the ratio of the components (A) and (B) to the components (A), (B) and (C), i.e. [[(A)+(B)]/[(A)+(B)+(C)]]×100, is 20 to 90% by weight, more preferably 30 to 80% by weight, even more preferably 40 to 70% by weight.

The total amount of the components (A), (B) and (C) [components (B) and (C) may be each 0% by weight] in the additive for hydraulic compositions according to the invention is preferably 5 to 100% by weight, more preferably 10 to 100% by weight, even more preferably 20 to 100% by weight.

For operativeness, the additive for hydraulic compositions according to the invention is preferably used as a solution. As the solvent, water or an organic solvent can be used, and in respect of safety, the additive is preferably used as an aqueous solution using water as the solvent. An aqueous solution containing the components (A), (B) and (C) (also referred to hereinafter as the active ingredient) at a total concentration of 20 wt % or more is preferably used to exhibit an uniform appearance at 20° C. For operativeness, the viscosity of the aqueous solution at 20° C. is preferably 500 mPa·s or less, more preferably 400 mPa·s or less, even more preferably 1 to 400 mPa·s, further even more preferably 200 mPa·s or less, further even more preferably 1 to 200 mPa·s.

In the additive for hydraulic compositions according to the invention, other components such as a dispersant having a structure other than those of the components (A), (B) and (C) can be simultaneously used. The dispersant may be any dispersants used generally as concrete admixtures, and conventional water-reducing agents including oxycarboxylic acids or salts thereof such as sodium gluconate, naphthalene sulfonate-formaldehyde condensates, melamine sulfonate-formaldehyde condensates, polycarboxylic acids or esters thereof or salts thereof, purified ligninsulfonic acid or salts thereof, polystyrene sulfonates, cement dispersants having a phenol skeleton (for example, a formaldehyde co-condensate of phenolsulfonic acid with other copolymerizable monomers), cement dispersants based on anilinesulfonic acid (for example, a formaldehyde co-condensate of anilinesulfonic acid with other copolymerizable monomers) are preferably used, among which the naphthalene sulfonate-formaldehyde condensates and melamine sulfonate-formaldehyde condensates are more preferably used from the viewpoint of the stability of air in the hydraulic composition.

In place of the copolymer as the component (C), a polymer prepared by graft-polymerization of an ethylenically unsaturated monomer with a polyether compound, as described in claims in JP-A 11-139855, can also be used.

Further, the additive of the invention according to the embodiments described above is excellent in the state of an aqueous solution, and can be used in a hydraulic composition such as concrete etc. to confer excellent flow on the hydraulic composition, to reduce the viscosity and to stably exhibit the fresh state of the hydraulic composition so that the workability and operativeness for use of the hydraulic composition in delivery by pressurization with a pump, in placing, or in compacting into a form can be significantly improved.

The additive for hydraulic compositions according to the invention may be combined with any other known additive. The other additive includes, for example, air-entraining (AE) agents, flow promoters, setting retardants, reinforcing agents, setting promoters, foaming agents, water-retaining agents, viscosity-increasing agents, water-proofing agents, antifoaming agents, shrinkage-reducing agents, other polymers (such as water-soluble polymers or a carboxylic acid polymer) as well as silica sand, blast furnace slag, fly ash, silica fume, etc.

Among these materials, the antifoaming agent is preferably contained. The antifoaming agent [excluding the component (B)] includes antifoaming agents based on (1) a lower alcohol such as methanol, ethanol, etc., (2) silicone such as dimethyl silicone oil, fluorosilicone oil etc., (3) mineral oils such as blends of mineral oils and surfactants, etc., (4) trialkyl phosphates such as tributyl phosphate etc., (5) fatty acids or fatty esters, such as oleic acid, sorbitan oleic monoester, polyethylene glycol fatty ester, polyethylene glycol/polypropylene glycol fatty ester, etc., and (6) polyoxyalkylene such as polypropylene glycol, polyethylene glycol/polypropylene glycol alkyl ether, etc. The antifoaming agent is preferably at least one antifoaming agent selected from a fatty acid- or fatty ester-based antifoaming agent, a silicone-based antifoaming agent, a polyoxyalkylene-based antifoaming agent and a trialkyl phosphate-based antifoaming agent, more preferably at least one antifoaming agent selected from a fatty acid- or fatty ester-based antifoaming agent, a silicone-based antifoaming agent and a polyoxyalkylene-based antifoaming agent, even more preferably at least one antifoaming agent selected from a fatty acid- or fatty ester-based antifoaming agent and a silicone-based antifoaming agent, even more preferably a silicone-based antifoaming agent, from the viewpoint of the stability of a mixture with the additive for hydraulic compositions according to the invention. The amount of the air required is varied depending on the use of the hydraulic composition, but from the viewpoint of the strength and freeze-thaw resistance of the hydraulic composition, the amount of the antifoaming agent added is preferably 0.01 to 10 parts by weight, more preferably 0.05 to 5 parts by weight, even more preferably 0.1 to 3 parts by weight, based on 100 parts by weight in total of the components (A), (B) and (C) in the additive of the present invention.

When the antifoaming agent is used, it is preferable to use a carboxylic acid polymer or a salt thereof represented by formula (8) from the viewpoint of improvement in efficiency of the antifoaming agent and stability of foams at an initial stage of mixing of a hydraulic composition. Two or more of the carboxylic acid polymer or a salt thereof can be used in combination.

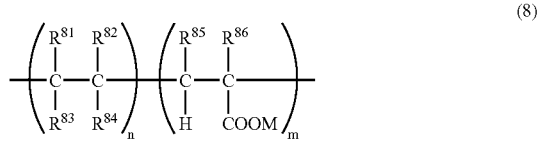

(8)

In the formula, $R^{81}$ to $R^{86}$ each are hydrogen atom, an alkyl group having 1 to 5 carbon atoms, an alkoxy group having 1 to 5 carbon atoms, COOM, OH, $SO_3M$, NHOSOM (amide sulfonate), or benzene ring, and they may be the same as or different from one another. M may be a hydrogen atom, an alkali metal, an alkylamine having 1 to 4 carbon atoms, or an alkanolamine having 1 to 6 carbon atoms. n and m each represent an average added mole number of the monomer shown in parentheses and n may be 0. When n is 0, it is a homopolymer of a monomer having the mole number of m. The copylymerization molar ratio of n and m, n/m, is preferably 0/10 to 10/1. It is more preferably 0/10 to 8/2, even more preferably 0/10 to 7/3, even more preferably 0/10 to 5/5 from the viewpoint of improvement in efficiency of the antifoaming agent, stability of air and prevention of separation of an aqueous additive solution. The weight-average molecular weight thereof (MW) is preferably 1,000 to 200,000, more preferably 3,000 to 100,000, even more preferably 5,000 to 50,000. Further both ends are not specified.

The weight ratio of the carboxylic acid polymer or a salt thereof represented by the formula (8)/the antifoaming agent is preferably 99.5/0.5 to 50/50, more preferably 99/1 to 70/30, even more preferably 99/1 to 90/10, from the viewpoint of improvement in efficiency of the antifoaming agent and prevention of separation of an aqueous additive solution.

Examples of carboxylic acid polymer or a salt thereof represented by the formula (8) include acrylic homopolymer, copolymer of acrylic acid and maleic acid, methacrylic homopolymer, copolymer of methacrylic acid and acrylic acid, copolymer of acrylic sulfonic acid and acrylic acid, copolymer of acrylic sulfonic acid and maleic acid, α-hydroxyacrylic acid homopolymer, copolymer of olefin (5 carbon atoms) and maleic acid, copolymer of isobutylene and maleic acid, copolymer of vinyl acetate and maleic acid, copolymer of styrene and maleic acid or the like, and then an alkali metal salt thereof or an amine salt thereof. The acrylic sulfonic acid monomer includes 2-acrylamide-2-methylpropane sulfonic acid or the like. Preferable is acrylic acid homopolymer, copolymer of acrylic acid and maleic acid, methacrylic acid homopolymer, copolymer of acryl sulfonic acid and maleic acid, copolymer of olefin (5 carbon atoms) and maleic acid or copolymer of isobutylene and maleic acid and a salt thereof. From the viewpoint of stability of the aqueous solution, more preferable is a copolymer or a salt thereof of a monomer having a sulfonic acid group and a monomer having a carboxylic acid group. Among them, preferable is copolymer or a salt thereof of acrylic sulfonic acid and maleic acid. Using the carboxylic acid polymer or a salt thereof in combination, the antifoaming effect can be further improved without any damage to product stability during manufacturing.

The above mentioned carboxylic acid polymer or a salt thereof may be used in an amount of 0.001 to 1.0 wt %, more preferably 0.005 to 0.1 wt %, even more preferably 0.01 to 0.05 wt %. Further, the above mentioned carboxylic acid polymer or a salt thereof is commercially available as Poize 540, Poize 530, Poize 521 or Poize 520 of Kao Corporation, Paleblack 1200 or Paleblack 5000 of Nihon Peroxide Co., Ltd., Quinflow 540, Quinflow 542, Quinflow 543, Quinflow 560, Quinflow 640 or Quinflow 750 of Zeon Corporation, Ltd. or Aron T40, Aron A-6012 and Aron A-12SL of Toagosei Co., Ltd. or the like.

<Hydraulic Composition>

The present invention relates to a hydraulic composition containing the additive for hydraulic compositions according to the invention, hydraulic powder and water.

In the hydraulic composition of the present invention, the component (A) is contained preferably in an amount of 0.01 to 7.5 parts by weight, more preferably 0.05 to 5 parts by weight, based on 100 parts by weight of the hydraulic powder. Further, in the hydraulic composition of the present invention, the total amount of the components (A), (B) and (C) is preferably 0.01 to 10 parts by weight, more preferably 0.01 to 7.5 parts by weight, even more preferably 0.05 to 3 parts by weight, based on 100 parts by weight of the hydraulic powder.

The additive for hydraulic compositions in the present invention is used in hydraulic compositions such as cement in civil engineering, buildings and secondary products, and its use is not particularly limited. The hydraulic composition in which the additive of the invention can well function preferably is paste, mortar or concrete containing water, cement and aggregate.

The cement includes ordinary Portland cement, rapid-hardening Portland cement, ultra-rapid-hardening Portland cement and ecocement (for example JIS R5214 (Japan Industrial Standard R5214) etc.). The hydraulic composition of the present invention may contain blast furnace slag, fly ash, silica fume etc. as hydraulic powder other than cement, or may contain non-hydraulic fine limestone powder etc. Silica fume cement or blast furnace cement, which is mixed with cement, may be used.

Further, the hydraulic composition of the present invention may contain an aggregate. The aggregate includes fine aggregate and coarse aggregate, and the fine aggregate is preferably mountain sand, land sand, river sand or crushed sand, and the coarse aggregate is mountain gravel, land gravel, river gravel or crushed stone. Depending on the use, light-weight aggregate may also be used. These terms of aggregate are in accordance with Comprehensive Bibliography of Concrete (in Japanese) (published on Jun. 10, 1998 by Gijyutsu Shoin).

The water/hydraulic powder ratio in the hydraulic composition [percentage by weight (wt %) of water/hydraulic powder in the composition, referred to hereinafter as W/P] may be 60% or less, preferably 5 to 55%, more preferably 5 to 50%, even more preferably 5 to 40%, even more preferably 5 to 35%. As the W/P value is decreased, the low viscosity of the hydraulic composition of the present invention becomes significant.

Now, further preferable examples of the hydraulic composition of the present invention will be described.

<(1) Hydraulic Compositions for Vibrated Products>

Concrete products (also called vibrated products) such as side ditches, box culverts, segments etc. are molded mainly by compacting fresh concrete extremely poor in flow and containing a relatively low amount of cement and fine aggregate and a large amount of coarse aggregate into a form and strongly vibrating the concrete.

It is preferable that such vibrated products include few residual air, caused by insufficient compacting, on the surface of set products and has a smooth surface. Since a fresh concrete prepared with a conventional water-reducing agent for concrete has a high mortar viscosity, air cannot be sufficiently removed by vibration and much residual air remains, thus failing to provide set products with a good surface.

When the additive of the invention is used as a water-reducing agent for vibrated products, the resulting mortar has low viscosity so that air hardly remains, thus providing a product with an excellent surface after setting. In addition, when the surface of the product after setting can be at the same level as in conventional products, the strength of vibration can be reduced to solve noises caused by vibration. In the hydraulic composition for vibrated products, the component (A) in the additive of the present invention is used in an amount of preferably 0.01 to 7.5 parts by weight, more preferably 0.05 to 5 parts by weight, even more preferably 0.08 to 2 parts by weight, based on 100 parts by weight of the hydraulic powder.

<(2) High-strength Hydraulic Composition>

In the case of a high-strength or ultra-high-strength hydraulic composition having preferably a W/P ratio of 40% or less, more preferably 5 to 40%, even more preferably 5 to 30%, further even more preferably 5 to 20%, a large amount of hydraulic powder should be dispersed with a small water content. A conventional dispersant for hydraulic compositions can confer flowability on hydraulic powder, but as the W/P ratio is reduced, the viscosity of the hydraulic powder is rapidly increased, thus causing the problem of deterioration in compacting property into a form.

The additive of the invention can be used to reduce the viscosity of the hydraulic composition having a low W/P ratio, thus significantly contributing to solving the problem.

When fine aggregate used to constitute the hydraulic composition has a specific particle-size distribution, the viscosity of the high-strength hydraulic composition having a low W/P ratio can be further reduced to solve the problem at higher level.

That is, the fine aggregate used in the hydraulic composition is preferably fine aggregate having such particle size distribution that the percentage of particles passing through a screen having a nominal dimension of 0.3 mm used in JIS A 1102 (Japan Industrial Standard A 1102) (referred to hereinafter as 0.3 mm passage degree) is 1 to less than 10% by weight, and the degree of coarse particles is 2.5 to 3.5 (this fine aggregate is referred to hereinafter as fine aggregate A).

The fine aggregate A is more preferably an aggregate wherein the degree of passage through a screen having a nominal dimension of higher than 0.3 mm is within the range of standard particle size distribution.

In the present invention, the 0.3 mm passage degree of the thin aggregate A is preferably less than 10%, more preferably 9% or less, even more preferably 7% or less, from the viewpoint of the flow of the hydraulic composition. In respect of the separation resistance of the material in the hydraulic composition, the 0.3 mm passage degree is preferably 1% or more, more preferably 3% or more, even more preferably higher than 5%.

Accordingly, the 0.3 mm passage degree is preferably 1% or more to less than 10%, more preferably 3% or more to 9% or less, still more preferably higher than 5% to 7% or less, from the viewpoint of flow retention and material separation resistance.

In addition to the requirements described above, the degree of coarse particles (JIS A0203-3019-Japan Industrial Standard A0203-3019) in the thin aggregate A is preferably 2.5 to 3.5, more preferably 2.6 to 3.3, even more preferably 2.7 to 3.1. When the degree of coarse particles is 2.5 or more, the viscosity of the concrete is reduced, while when the degree of coarse particles is 3.5 or less, the separation resistance of the material is improved.

The degree of passage of the thin aggregate A through a screen having a nominal dimension of higher than 0.3 mm used in JIS A 1102 is preferably within the range of standard particle sizes in Table 1 in Document 1 attached to JIS A 5308. The degree of passage through a screen having a nominal dimension of 0.15 mm is more preferably less than 2% by weight, even more preferably less than 1.5% by weight. However, the degree of passage is preferably 0.5 wt % or more from the viewpoint of the separation resistance of the material. A screen having a nominal dimension of higher than 0.3 mm should be the one having degrees of passage within the range of standard particle sizes in one or more nominal dimensions, preferably in all nominal dimensions.

The thin aggregate A may be used by a suitable combination of known materials such as sand, gravel etc. insofar as it satisfies the particle size distribution and the degree of coarse particles. The thin aggregate which can be used in the present invention includes river sand in a specific region such as the Min river in Fuchien Province in China. Because river sand, mountain sand and crushed sand have fewer pores to adsorb less water and can be endowed with fluidity with a small water content, these sands are more preferable than sea sand. The specific gravity of thin aggregate A on an oven-dry weight basis (JIS A 0203: number 3015) is preferably 2.56 or more.

The thin aggregate A can also be used in hydraulic compositions other than the high-strength hydraulic composition.

In the high-strength hydraulic composition, the component (A) as the additive of the invention is used in an amount of preferably 0.05 to 10 parts by weight, more preferably 0.08 to 7.5 parts by weight, even more preferably 0.1 to 4 parts by weight, based on 100 parts by weight of the hydraulic powder.

<(3) Hydraulic Composition Compounded with Ecocement>

From the viewpoint of saving resources, there is an attempt in recent years at admixing byproducts such as recycled materials and various inorganic materials with cement as a major material of the hydraulic composition (JP-A 11-228197, JP-A 2003-146726). The additive for hydraulic compositions according to the invention can also be used to impart fresh states such as low viscosity, excellent flow and flow retention to a hydraulic composition (ecocement) having a low W/P ratio containing such material, that is, one or more materials such as incinerated ash of refuse from cities and incinerated ash of sewage sludge as the starting material, 10 to 40% by weight of at least one of $C_{11}A_7CaCl_2$, $C_{11}A_7CaF_2$ and $C_3A$ and a burned material containing at least one of $C_2S$ and $C_3S$, and gypsum.

<Set Product>

Set products obtained from the hydraulic composition of the present invention include structures and concrete products, and the structures include, for example, reinforced concrete, essential parts such as pillars, beams, floorboards and load bearing walls in reinforced concrete buildings, roads, bridges, bridge piers, girder, tunnels, headrace, dams, sewerage, break waters, retaining wall, and civil engineering structures. The concrete products include, for example, vibrated molded articles such as culverts, side ditches and segments and centrifuged molded products such as poles, piles and fume tubes.

(Mechanism)

The mechanism of adsorption, dispersion and fluidization of the additive of the invention on hydraulic powder etc. is not revealed at present but is estimated as follows: As the component (A), the monoester showing strong adhesiveness to hydraulic powder is adsorbed via its phosphoric acid group onto the surface of hydraulic powder etc. such as cement thereby forming an inner layer having alkyl groups, alkenyl groups, etc., directed to the outside, whereby the surface of the hydraulic powder is rendered hydrophobic. The hydrophobic region on the surface is provided with an outer layer where the diester showing low adhesiveness to the hydraulic powder etc. is arranged (inserted), and by an externally directed hydrophilic region on the outer layer, the hydraulic powder is dispersed and fluidized, whereby the viscosity of the slurry of the hydraulic powder etc. is reduced. That is, the adsorbed two layers thus formed are considered to cause dispersion, fluidization and reduction in viscosity.

When the component (B) is simultaneously used, the component (B) hardly showing adhesiveness forms an outer layer where hydrophobic groups (alkyl groups, alkenyl groups, etc.) of the component (B) are arranged (inserted) in the hydrophobic region formed from the monoester, and by hydrophilic regions directed to the outside, the hydraulic powder is dispersed. In the component (B) having hydrophobic groups at both terminals, the hydrophobic regions are considered to be directed to the outside. It is estimated that the two layers, that is, the inner and outer layers, are formed simultaneously rather than subsequently.

When the component (C) is simultaneously used, the rate of adsorption of the component (A) or the components (A) and (B) onto hydraulic powder etc. is higher than that of the component (C), and the component (C) is subsequently adsorbed. First, the component (A) or the components (A) and (B) disperse the hydraulic powder etc. finely just after mixing of the hydraulic composition, to impart low viscosity to the composition. Then, the specific surface area of the hydraulic powder etc. is increased with time by hydration, thus causing a reduction in flowability, but the component (C) can be gradually adsorbed onto the hydraulic powder etc., to exhibit flow retention.

According to the present invention, there can be obtained an additive for hydraulic compositions endowing a hydraulic composition, particularly a hydraulic composition containing slurry of hydraulic powder in water, with an extremely excellent viscosity-reducing effect, flowability and an effect of imparting stability to entrained air. Even if the additive of the present invention is formed into an aqueous solution of the active ingredient at an effective concentration of 20 wt % or more in the additive, the solution is an uniform solution of low viscosity, thus significantly improving operativeness. Further, the component (B) can be simultaneously used to improve the flow imparting effect on the hydraulic composition, and the component (C) can be simultaneously used to improve flow retention.

EXAMPLES

The following examples further describe and demonstrate embodiments of the present invention. The examples are given solely for the purpose of illustration and are not to be construed as limitations of the present invention. Hereinafter, the term simply described as "%" in the production example of each component means % by weight.

<Component (A)>

The components (A), practically here including other components than (A), used in the Examples and Comparative Examples are shown in Table 1, and these are produced according to Production Examples A-1 to A-3 below. The neutralization degree of (A) and the monoester weight content of monoester/(monoester+diester) of (A) are shown in Table 1. Trade names of the starting alcohols in Table 1 are below shown.

Softanol 70: Secondary alcohol (C12 to C14) EO adduct (average number of EO molecules added, 7) manufactured by Nippon Shokubai Co., Ltd.

Fine Oxocol 180N: poly-branched synthetic alcohol (C18) manufactured by Nissan Chemical Industries, Ltd.

The monoester ratio (a) in Table 1 was calculated by the following method (a). The monoester weight content is calculated from the monoester and the diester as the acid compound thereof according to the method (a). Results do not depend on the neutralization degree, but are almost equivalent to the weight ratio of monoester/(monoester+diester) of the monoester and the diester actually used.

(Method (a) of Calculating the Ratio of the Monoester)

Acid value 1, acid value 2 and acid value 3 of a reaction product before and after hydrolysis reaction (to calculate the ratio of the monoester in a production process where hydrolysis reaction was not carried out, hydrolyzing water in an amount of 5% by weight based on the total amount of the charged materials was added and the mixture was hydrolyzed at 80° C. for 6 hours to give the reaction product after hydrolysis reaction) were measured, and from these values, the ratio of the monoester was determined. The reaction product was dissolved in ethanol/water (70% by volume/30% by volume), and its acid value was measured by multi-step titration with an automatic potentiometric titration unit AT-500 (Kyoto Denshi Kogyo) with 0.5 mol/l aqueous potassium hydroxide (reagent) as a titration standard solution. The acid value 1 and acid value 2 of the reaction product were successively measured. The acid value 3 was measured by using a sample other than that of acid values 1 and 2. The acid value 3 was measured in the same manner as for acid value 1, and just after titration of the acid value 1 was finished, about 20 ml of 1 M aqueous calcium chloride was added to the measurement solution. Because some titration end points could appear, the final end point was regarded as the titration end point of acid value 3.

Phosphoric monoester has acid value 1 and acid value 2, phosphoric diester has acid value 1 only, pyrophosphoric diester has acid value 1 only, pyrophosphoric acid has acid value 1 and acid value 2, and phosphoric acid has acid value 1, acid value 2 and acid value 3. By hydrolysis, pyrophosphoric diester is decomposed into two phosphoric monoesters, and pyrophosphoric acid is decomposed into two phosphoric acids.

The acid value 1 did not change before and after hydrolysis reaction, and thus the acid value 2 and the acid value 3 after hydrolysis reaction were corrected by proportional calculation such that the acid value 1 after hydrolysis reaction became equal to the acid value 1 before hydrolysis reaction. The acid value 1, acid value 2 and acid value 3 before hydrolysis reaction are expressed as k, m and n, respectively, and the acid value 2 and acid value 3 after hydrolysis reaction are expressed as p and q, respectively. The molar amount of the phosphoric monoester, the molar amount of the phosphoric diester (not including pyrophosphoric diester; this applies hereinafter in this calculation) and the molar amount of pyrophosphoric diester are obtained in the following equations:

Molar amount (mol) of phosphoric monoester= $(-k+m+p-q)/56108$

Molar amount (mol) of phosphoric diester= $(2k-p)/56108$

Molar amount (mol) of pyrophosphoric diester= $(-0.5m+0.5p)/56108$

On the other hand, the molecular weight (56108/hydroxyl value) of the polyoxyalkylene alkyl (or alkenyl or aryl, etc) ether is determined from the hydroxyl value of the starting material of polyoxyalkylene alkyl (or alkenyl or aryl, etc) ether and, taking the obtained molecular weight as M, molecular weights of the phosphoric monoester, phosphoric diester and pyrophosphoric diester ($Mw1$, $Mw2$ and $Mw3$, respectively) are determined according to the following equations:

Molecular weight of phosphoric monoester; $Mw1 = M+80.0$

Molecular weight of phosphoric diester; $Mw2 = 2M+62.0$

Molecular weight of pyrophosphoric diester; $Mw3=2M+141.9$

The ratio of the monoester was determined according to the following equation:

Ratio of monoester=(molar amount of phosphoric monoester)×$Mw1$/[(molar amount of phosphoric monoester)×$Mw1$+(molar amount of phosphoric diester)×$Mw2$+(molar amount of pyrophosphoric diester)×$Mw3$]

The acid value and hydroxyl value are expressed in mg KOH/g.

(1) Production Example A-1

380 g (0.81 mol) oleyl alcohol EO adduct (average number of EO molecules added, 4; hydroxyl value, 119.1) was introduced into a reactor equipped with a stirrer, and then purged with nitrogen while stirring to replace the atmosphere by nitrogen. The sample was heated to 80° C. and water in the sample was removed under reduced pressure. After the sample was returned to normal pressures at 40° C., 40.5 g (0.28 mol) commercial anhydrous phosphoric acid (purity 98%) was added thereto. The anhydrous phosphoric acid was added in 3 divided portions. Thereafter, the mixture was aged for 6 hours while the temperature of the solution was regulated in the range of 65 to 75° C.

The acid value 1 of the reaction product was measured, and the reaction solution was regulated with tap water and 48% aqueous potassium hydroxide such that the degree of neutralization was 0.5 to 1.0 relative to the acid value 1 and the concentration was 20% by weight, to give a-12 as component (A) in Table 1. a-19 was also obtained according to this method. a-14 was produced according to this method except that aging before neutralization was carried out for 24 hours.

a-1, a-5, a-15, a-20 and a-22 were produced according to this method except that aging was carried out after anhydrous phosphoric acid was added, then 16.2 g tap water was added thereto, the temperature of the solution was controlled at 80° C., and the sample was hydrolyzed for additional 2 hours.

(2) Production Example A-2

300 g (0.45 mol) myristyl alcohol EO adduct (average number of EO molecules added, 10; hydroxyl value, 85.0) was introduced into a reactor equipped with a stirrer, and then purged with nitrogen while stirring to replace the atmosphere by nitrogen. The sample was heated to 80° C. and water in the sample was removed under reduced pressure. After the sample was returned to normal pressures at 60° C., 9.61 g (0.08 mol) phosphoric acid (purity 85%) was added dropwise thereto. When the sample became substantially uniform, 26.8 g (0.18 mol) commercial anhydrous phosphoric acid (purity 98%) was added thereto. The anhydrous phosphoric acid was added in 3 divided portions. Thereafter, the sample was aged for 6 hours while the temperature of the solution was regulated in the range of 65 to 75° C. 16.8 g tap water was added thereto, and the sample was reacted for additional 2 hours while the temperature of the solution was controlled at 80° C.

The acid value 1 of the reaction product was measured, and the reaction solution was regulated with tap water and 48% aqueous potassium hydroxide such that the degree of neutralization was 0.5 to 1.0 relative to the acid value 1 and the concentration was 20% by weight, to give a-3 as component (A) in Table 1. Separately, a-2, a-4, a-6, a-8, a-9, a-10, a-13, a-16, a-17, a-18, a-21, a-23, a-24 and a-25 were also obtained according to this method. When the solution was hardly made uniform after dropwise addition of phosphoric acid (purity 85%), the solution was stirred at a temperature of 80° C.

(3) Production Example A-3

38.7 g (0.25 mol) phosphorus oxychloride and 500 g tetrahydrofuran (THF) were introduced into a reactor equipped with a stirrer, and then stirred sufficiently. The solution was stirred at a temperature of −30° C. or less in a dry ice-isopropyl alcohol bath. A solution of 150 g (0.23 mol) oleyl alcohol EO adduct (average number of EO molecules added, 9; hydroxyl value, 85.8) and 23.2 g (0.23 mol) triethylamine in 400 g THF was added dropwise to the above solution, during which the amount of the solution added was controlled such that the temperature of the reaction solution was −30° C. or less. Because the reaction proceeded to make the viscosity of the solution too high, additional 500 g THF was added. One hour after the solution was added, the reaction mixture was placed in an iced bath and aged at 0° C. for 0.5 hour.

Insolubles in the reaction solution were removed by filtration under suction. The filtrate was transferred to a reactor equipped with a stirrer, and 35 g distilled water was added thereto, and the sample was hydrolyzed at 40° C. for 1 hour. The reaction product was trapped in an evaporator to remove THF.

The acid value 1 of the reaction product was measured, and the reaction solution was regulated with tap water and 48% aqueous sodium hydroxide or 48% aqueous potassium hydroxide such that the degree of neutralization was 1.0 relative to the acid value 1 and the concentration was 20% by weight, to give a-7 as component (A) in Table 1.

a-11 was produced according to this method in which a mixture of 16.8 g (0.11 mol) phosphorus oxychloride and 500 g tetrahydrofuran (THF) was stirred at a temperature of −10° C., and a solution of an oleyl alcohol EO addition product and triethylamine in THF was added dropwise to the above-described solution, during which the amount of the solution added was controlled such that the temperature of the reaction solution became −10 to 0° C., and 4 hours after the solution was added, the reaction mixture was placed in an iced bath and aged at 0° C. for 12 hours.

<Component (B)>

The components (B) used in the Examples and Comparative Examples are shown in Table 2, and can be obtained by a general process for producing nonionic compounds such as nonionic surfactants. A process for producing polyoxyalkylene alkyl ether [myristyl alcohol EO (average number of EO molecules added: 16)] is shown in Production Example B-1.

(1) Production Example B-1

214 g myristyl alcohol and 0.84 g potassium hydroxide were introduced into a pressure vessel (3 L) and then stirred, and the air in the vessel was eliminated and replaced by nitrogen. After the mixture was heated to 110° C., the mixture was dehydrated at 0.00267 MPa for 30 minutes. The mixture was heated to 155° C. and reacted with 709.8 g EO at the initial pressure at 0.02 MPa. The reaction mixture was aged for 30 minutes. The mixture was cooled to 80° C. and degassed at 0.00133 MPa for 15 minutes. The reaction mixture was neutralized with 0.90 g acetic acid at the same temperature (80° C.), to give b-2.

<Component (C)>

The components (C) used in the Examples and Comparative Examples are shown in Table 3, and these were produced according to Production Examples C-1 to C-3 below.

(1) Production Example C-1

A glass reaction vessel equipped with a thermometer, a stirrer, a dropping funnel, a nitrogen inlet pipe and a reflux condenser was charged with 366 parts by weight of water and then purged with nitrogen. Then, the vessel was heated to 80° C. in a nitrogen atmosphere, and 3 solutions, that is, a mixture of 898 parts by weight of 60% aqueous solution of a methanol EO (average number of EO molecules added, 120) adduct/methacrylic monoester and 34.4 parts by weight of methacrylic acid, 62.3 parts by weight of 5% aqueous 2-mercaptoethanol, and 68.4 parts by weight of 5% aqueous ammonium persulfate, were simultaneously added dropwise thereto over 90 minutes. Then, the mixture was aged at the same temperature for 1 hour, and then 22.8 parts by weight of 5% aqueous ammonium persulfate was added thereto over 30 minutes and thereafter aged at the same temperature for 2 hours. The reaction mixture was neutralized by adding 23.3 parts by weight of 48% sodium hydroxide, then 8.0 parts by weight of 35% aqueous hydrogen peroxide, and the mixture was heated at 90° C. for 1 hour and then cooled to give a copolymer c-1 having a weight average molecular weight of 53,000 (sodium salt, degree of neutralization of 70%). c-4 was also produced in the same manner as for c-1 except that the methanol EO (average number of EO molecules added, 18) adduct/methacrylic monoester was used in the molar ratio shown in Table 3.

(2) Production Example C-2

A glass reaction vessel equipped with a thermometer, a stirrer, a dropping funnel, a nitrogen inlet pipe and a reflux condenser was charged with 70 moles of water, then purged with nitrogen under stirring and heated to 75° C. in a nitrogen atmosphere. Then, 3 solutions, that is, a mixture of 0.1 mol methanol EO (average number of EO molecules added, 120) adduct/methacrylic monoester, 0.7 mol methyl acrylate and 0.2 mol methacrylic acid, 0.05 mol (effective concentration) of 20% aqueous ammonium persulfate, and 0.1 mol of 20% aqueous 2-mercaptoethanol, were simultaneously added dropwise thereto over 2 hours. Then, 0.02 mol of 20% aqueous ammonium persulfate was added thereto over 30 minutes and thereafter aged for 1 hour at the same temperature (75° C.). After aging, the mixture was heated at 95° C., and 0.2 mol of 35% aqueous hydrogen peroxide was added dropwise for 30 minutes, then the mixture was aged for 2 hours at the same temperature (95° C.), and 0.07 mol of 48% aqueous sodium hydroxide was added to the reaction mixture, whereby a copolymer c-2 having a weight-average molecular weight of 40,000 was obtained.

(3) Production Example C-3

Copolymer c-3 was obtained according to Example 8 in JP-A 2001-180998. However, methanol EO (average number of EO molecules added, 120) adduct/methacrylic monoester was used in place of monomer (A-IV) in the above publication.

Example 1

The additives shown in Table 4 were prepared from the component (A) in Table 1, and the physical properties of aqueous solutions of the additives and the performance thereof on the following mortar mix proportion were evaluated in the following test methods. The component (A) was added so as to achieve a mortar flow of 180±30 mm. The results are shown in Table 4.

(1) Mortar Mix Proportion

Cement: 1100 g (mixture of ordinary Portland cement (Taiheiyo Cement Corporation) and ordinary Portland cement (Sumitomo Osaka Cement Co., Ltd.) in a ratio of 1/1, a specific gravity of 3.16)

Tap water: 440 g (containing the additive and an antifoaming agent)

Sand: 1925 g (land sand from Kimitsu in Chiba Pref., a specific gravity of saturated surface dry aggregate of 2.63)

W/P: 40.0%

(2) Evaluation Items (2-1) Mortar Flow

The above components were mixed (63 rpm, 90 seconds) in a mortar mixer described in JIS R 5201 to prepare mortar, and its mortar flow was measured as an indicator. The mortar flow was measured by using a flow cone (upper diameter 70 mm×lower diameter 100 mm×height 60 mm) described in JIS R 5201.

(2-2) Mortar Viscosity

The mortar obtained in (2-1) above was used, and the dropping time (seconds) of the mortar through a funnel-shaped device (upper inner diameter 100 mm×lower inner diameter 14 mm×length 328 mm) was used as an indicator of mortar viscosity. That is, the mortar after mixing under the conditions described above were introduced into a stainless steel (SUS 304) device with a closed lower discharge opening 2, as shown in FIG. 1, the mortar was cut along the face of an upper charge opening 1, then the lower discharge opening 2 was opened for gravity-drop of the mortar, and the time (dropping time: seconds) elapsed until a hole was recognized at least partially in the mortal which was determined by observing the upper charge opening 1 and used as a measure of viscosity. The shorter the dropping time is, the lower viscosity the mortar has.

(2-3) State of an Aqueous Solution

An aqueous solution of the additive [aqueous solution of the components (A), (B) and (C) as the additive at a total concentration of 20% by weight] was left at 20° C. for 24 hours after preparation, and then the state of the aqueous solution was visually observed. When the aqueous solution was uniform, the viscosity at 20° C. was measured with a programmable viscometer DVII+ (Brookfield) and evaluated according to the following criteria. When this evaluation is Δ, ○ or ◎, the aqueous solution can be said to be in a state without any problem in pump transferability etc.
◎: The viscosity was less than 150 mPa·s.
○: The viscosity was from 150 mPa·s to less than 300 mPa·s.
Δ: The viscosity was from 300 mPa·s to less than 500 mPa·s.
X: The viscosity was 500 mPa·s or more, or the aqueous solution was not uniform.

(2-4) Easiness of Production

The process of producing the component (A) wherein the reaction temperature should be less than 0° C. as shown in Production Example A-3 requires extremely high production costs, and is thus industrially disadvantageous. Accordingly, when the reaction temperature was less than 0° C., the easiness of production was given X, while when the reaction temperature was 0° C. or more, the easiness of production was given ○.

Example 2

The additives shown in Table 5 were prepared from the component (A) in Table 1 and the component (B) in Table 2, and the performance thereof for mortar and the physical properties of aqueous solutions of the additives were evaluated in the same example as in example 1. The results are shown in Table 5.

Example 3

The additives shown in Table 6 were prepared from the component (A) in Table 1, the component (B) in Table 2 and the component (C) in Table 3, and the performance thereof for mortar and the physical properties of aqueous solutions of the additives were evaluated in the same manner as in Example 1. The results are shown in Table 6. The mortar was measured for initial mortar flow [about 3.5 minutes after water was added] under the mixing conditions of 63 rpm for 3 minutes, and the mortar was mixing again (63 rpm, 10 seconds) and measured for mortal flow 30 minutes, 60 minutes and 90 minutes, respectively after water was added, and this mortar flow was used as an indicator of flow retention. The mortar obtained by mixing (63 rpm, 3 minutes) for measuring initial mortar flow was also used for measurement of mortar viscosity.

Example 4

The additives shown in Table 7 were prepared from the component (A) in Table 1, the component (B) in Table 2 and the component (C) in Table 3, and the performance thereof for mortar were evaluated in the same manner as in Example 1. The results are shown in Table 7. The mortar mix proportion shown below was measured for initial mortar flow [about 2.5 minutes after water was added] after mixing at 63 rpm for 1 minute and then at 126 rpm for 1 minute, and the mortar was mixed again (63 rpm, 10 seconds) and measured for mortar flow 30 minutes, 60 minutes and 90 minutes respectively after water was added, and this mortar flow was used as an indicator of flow retention. The additive was added such that the initial mortar flow became 250±30 mm. Further, mortar obtained by separately mixing (63 rpm for 1 minute and then 126 rpm for 1 minute) such that the initial mortar flow became 240±5 mm was used for measurement of mortar viscosity (dropping time). The results are shown in Table 7.

(1) Mortar Mix Proportion
Cement: 1250 g (silica fume cement with a specific gravity 3.08, manufactured by Ube Mitsubishi Cement Corporation)
Tap water: 312.5 g (containing the additive and an antifoaming agent)
Sand: 1500 g (land sand from Kimitsu in Chiba Pref., a specific gravity of saturated surface dry aggregate of 2.63)
W/P: 25.0%

Example 5

The additives shown in Table 8 were prepared from the component (A) in Table 1, the component (B) in Table 2 and the component (C) in Table 3, and evaluated in the following manner. The results are shown in Table 8.

(1) Concrete Flow (1-1) Concrete Mix Proportion
Cement: 12.39 kg (mixture of ordinary Portland cement (Taiheiyo Cement Corporation) and ordinary Portland cement (Sumitomo Osaka Cement Co., Ltd.) in a ratio of 1/1, a specific gravity of 3.16)
Tap water: 4.95 kg (containing the additive, an antifoaming agent and an air entraining agent)
Sand: 23.79 kg (land sand from Kimitsu in Chiba Pref., a specific gravity of saturated surface dry aggregate of 2.63)
Gravel: 28.8 kg (crushed limestone from Chokeisan, a specific gravity of saturated surface dry aggregate of 2.72)
W/P: 40.0%

(1-2) Preparation of Mixing Water

In the concrete mix proportion, an aqueous solution of the additive [aqueous solution of the components (A), (B) and (C) and other components at a total concentration of 20% by weight], a silicone-based antifoaming agent antifoam 013B (polyorganosiloxane-based agent manufactured by Dow Corning Asia Ltd.) and if necessary an air entraining agent Mighty AE-03 (Kao Corporation) were added to tap water and stirred to give a uniform mixture.

(1-3) Preparation of Concrete

Gravel, a half amount of sand, cement, and sand as the balance were introduced in this order into a tilted cylinder mixer (Tombo Kogyo Co., Ltd.). Dry mixing (25 rpm) was carried out for 10 seconds. Then, the mixing water was added rapidly thereto, and the mixture was mixed for 180 seconds (25 rpm) The resulting concrete was measured for slump flow according to JIS A 1101. In this preparation, the amount of the additive added was regulated such that the slump flow became 350±20 mm. The amount of the air content in the resulting concrete was measured according to JIS-A1118. In this preparation, the amount of the air entraining agent added was regulated such that the amount of the air content was in the range of 4.5±1.5% by volume.

(1-4) Evaluation Methods (1) Concrete Flow and Air Content in Concrete

The slump flow of the resulting concrete was measured according to JIS A 1101 and used as an indicator of concrete flowability. The air content in the concrete was measured according to JIS-A1118. After evaluation, the concrete was returned to the mixer and stored under agitation at 2 rpm. The slump flow of the concrete was each measured 30 minutes and 60 minutes after mixing. The air content was also measured. However, Before measurement, the concrete was mixed with a scoop.

(2) Concrete Viscosity

Because direct measurement of concrete viscosity was difficult, the viscosity of mortar collected by passing the concrete prepared in (1-3) above through a screen (opening 4.75 mm) was evaluated as concrete viscosity. 2000 g of the collected mortar was placed in a 1000-ml stainless steel beaker, and the mortar was stirred for 1 minute at 50 rpm with a stirrer (Mazera Z-2310, Tokyo Rika Kikai Co., Ltd.) equipped with a stirring blade of 10 cm in length (length of the blade in the diameter direction of the beaker) and 5 cm in height (length of the blade in the height direction of the beaker), and the loaded electric power (w) of the stirrer was determined as a measure of mortar viscosity. The smaller the loaded electric power is, the lower viscosity the mortar has.

Example 6

Additives shown in Table 1 were prepared from (A) of Table 1, (B) of Table 2 and (C) of Table 3 and evaluated in the same way as Example 5. Results are shown in Table 9. In Example 6-2 to 6-5, carboxylic acid polymer salts (f-1 to f-5) shown in Table 10 were used in an amount shown in Table 9.

TABLE 2

| No | Compound |
|---|---|
| b-1 | Myristyl alcohol EO(8) adduct |
| b-2 | Myristyl alcohol EO(16) adduct |
| b-3 | Myristyl alcohol EO(40) adduct |
| b-4 | Myristyl alcohol EO(60) adduct |
| b-5 | Myristyl alcohol EO(80) adduct |
| b-6 | Myristyl alcohol EO(100) adduct |
| b-7 | Oleyl alcohol EO(9) adduct |
| b-8 | Oleyl alcohol EO(20) adduct |
| b-9 | Oleyl alcohol EO(60) adduct |
| b-10 | Monostearic acid EO(45) ester |
| b-11 | Stearyl amine EO(45) adduct |
| b-12 | Tallow alkylamine EO(100) adduct |
| b-13 | Tallow alkylamine EO(400) adduct |
| b-14 | Hardened castor oil EO(80) adduct |
| b-15 | Sorbitol tetraoleate EO(60) adduct |
| b-16 | Distyrenated phenol EO(64) adduct |
| b-17 | Sorbitol monooleate EO(20) adduct |
| b-18 | Lauryl alcohol EO(5) PO(4.5) EO(5) adduct(block, EO 69 mol-%) |
| b-19 | Behenyl alcohol EO(50) adduct |
| b-20 | Mixed(stearyl/palmityl = 88/12, weight ratio) alcohol EO(300) adduct |
| b-21 | Mixed(stearyl/palmityl = 88/12, weight ratio) alcohol EO(300) PO(70) adduct(block, EO 85 mol-%) |
| b-22 | Oleyl alcohol EO(40) adduct |
| b-23 | POE(23) oleyl ether Na sulfate |
| b-24 | POE(40) lauryl ether Na carboxylate |
| b-25 | Stearyl alcohol EO(100) PO(20) adduct(random, EO 83 mol-%) |
| b-26 | Stearyl alcohol EO(90) PO(30) adduct(random, EO 75 mol-%) |
| b-27 | Stearyl alcohol EO(60) PO(60) adduct(random, EO 50 mol-%) |
| b-28 | Distyrenated phenol EO(60) PO(60) adduct(random, EO 50 mol-%) |

TABLE 1

| No | Neutralization degree*1 | weight ratio of monoester/ (monoester + diester) | Ratio of monoester(a)*2 | Starting compound*3 | Production example | Easiness of production |
|---|---|---|---|---|---|---|
| a-1 | 0.5 | 0.43 | 0.42 | Decyl alcohol EO(3) adduct | A-1 | ○ |
| a-2 | 1.0 | 0.80 | 0.80 | Softanol 70 | A-2 | ○ |
| a-3 | 0.5 | 0.78 | 0.78 | Myristyl alcohol EO(10) adduct | A-2 | ○ |
| a-4 | 1.0 | 0.83 | 0.83 | Myristyl alcohol EO(20) adduct | A-2 | ○ |
| a-5 | 0.5 | 0.51 | 0.51 | Oleyl alcohol EO(9) adduct | A-1 | ○ |
| a-6 | 0.5 | 0.72 | 0.72 | Oleyl alcohol EO(9) adduct | A-2 | ○ |
| a-7 | 1.0 | 1.00 | 1.0 | Oleyl alcohol EO(9) adduct | A-3 | X |
| a-8 | 0.5 | 0.80 | 0.80 | Oleyl alcohol EO(15) adduct | A-2 | ○ |
| a-9 | 0.5 | 0.83 | 0.83 | Oleyl alcohol EO(20) adduct | A-2 | ○ |
| a-10 | 0.5 | 0.75 | 0.75 | EO(10) adduct of Fine Oxocol 180N | A-2 | ○ |
| a-11 | 1.0 | 0.10 | 0.10 | Oleyl alcohol EO(9) adduct | A-3 | X |
| a-12 | 0.5 | 0.29 | 0.29 | Oleyl alcohol EO(4) adduct | A-1 | ○ |
| a-13 | 0.5 | 0.78 | 0.78 | Oleyl alcohol EO(16) adduct | A-2 | ○ |
| a-14 | 0.5 | 0.42 | 0.42 | Methanol EO(9) adduct | A-1 | ○ |
| a-15 | 0.5 | 0.53 | 0.53 | Oleyl alcohol EO(20) adduct | A-1 | ○ |
| a-16 | 0.5 | 0.79 | 0.79 | Hexanol EO(10) adduct | A-2 | ○ |
| a-17 | 0.5 | 0.84 | 0.84 | Myristyl alcohol EO(12)adduct | A-2 | ○ |
| a-18 | 0.5 | 0.81 | 0.81 | Myristyl alcohol EO(14) adduct | A-2 | ○ |
| a-19 | 1.0 | 0.33 | 0.33 | Oleyl alcohol EO(20) adduct | A-1 | ○ |
| a-20 | 0.5 | 0.54 | 0.54 | Myristyl alcohol EO(4) adduct | A-1 | ○ |
| a-21 | 0.5 | 0.76 | 0.76 | Myristyl alcohol EO(8) adduct | A-2 | ○ |
| a-22 | 0.5 | 0.51 | 0.51 | Myristyl alcohol EO(10) adduct | A-1 | ○ |
| a-23 | 0.5 | 0.83 | 0.83 | Myristyl alcohol EO(25) adduct | A-2 | ○ |
| a-24 | 0.5 | 0.82 | 0.82 | Distyrenated phenol EO(13) adduct | A-2 | ○ |
| a-25 | 0.5 | 0.81 | 0.81 | Tristyrenated phenol EO(16) adduct | A-2 | ○ |

*1 neutralization degree per acid value 1
*2 the monoester weight content of monoester/(monoester + diester) calculated according to the calculation method (a)
*3 values parenthesized of the starting compound are an average added mole number (hereinafter applied)

TABLE 3

| Copolymer No | Copolymer | Mw | Production example |
|---|---|---|---|
| c-1 | Methanol EO(120)-methacrylic monoester/methacrylic acid(20/80) copolymer, sodium | 53000 | C-1 |
| c-2 | Methanol EO(120)-methacrylic monoester/methyl acrylate/methacrylic acid(10/70/20) copolymer, sodium | 40000 | C-2 |
| c-3 | Methanol EO(120)-methacrylic monoester/methanol EO(9)-methacrylic monoester/methacrylic acid(6/49/45) copolymer, sodium | 67000 | C-3 |
| c-4 | MethanolEO(18)-methacrylic monoester/methacrylic acid(37/63) copolymer, sodium | 25000 | C-1 |
| c-5 | Mariarim AKM-60F [polyoxyethylene monoallyl monomethyl ether/maleic anhyderide/styrene copolymer manufactured by NOF Corpolation.] | 24000 | — (commercial product) |

*The ratio of the monomer is expressed in molar ratio

TABLE 4

| | | Component (A) | | Mortar flow (mm) | Dropping time (second) | State of aqueous solution |
|---|---|---|---|---|---|---|
| | | Type | Dosage (weight-%) | | | |
| Example | 1-1 | a-1 | 0.90 | 184 | 10.2 | △ |
| | 1-2 | a-4 | 0.45 | 172 | 14.8 | ◎ |
| | 1-3 | a-5 | 0.85 | 194 | 13.9 | ○ |
| | 1-4 | a-5/a-6 = 1/1 (weight ratio) | 1.00 | 185 | 16.7 | ◎ |
| | 1-5 | a-8 | 0.50 | 179 | 15.5 | ◎ |
| | 1-6 | a-9 | 0.35 | 175 | 14.7 | ◎ |
| | 1-7 | a-10 | 0.67 | 176 | 16.0 | ○ |
| | 1-8 | a-15 | 0.33 | 188 | 16.4 | ○ |
| | 1-9 | a-25 | 0.90 | 172 | 15.5 | ◎ |
| Comparative example | 1-1 | c-4 | 0.12 | 164 | 23.2 | ◎ |
| | 1-2 | c-4 | 0.13 | 185 | 18.8 | ◎ |
| | 1-3 | c-4 | 0.14 | 204 | 17.2 | ◎ |
| | 1-4 | a-7 | 2.00 | 103 | Not measurable | ◎ |
| | 1-5 | a-11 | 1.00 | 110 | Not measurable | X |
| | 1-6 | a-12 | 0.80 | 190 | 14.2 | X |
| | 1-7 | a-14 | 2.10 | 164 | 22.2 | ◎ |
| | 1-8 | a-16 | 2.00 | 105 | Not measurable | ◎ |

Figure 2:
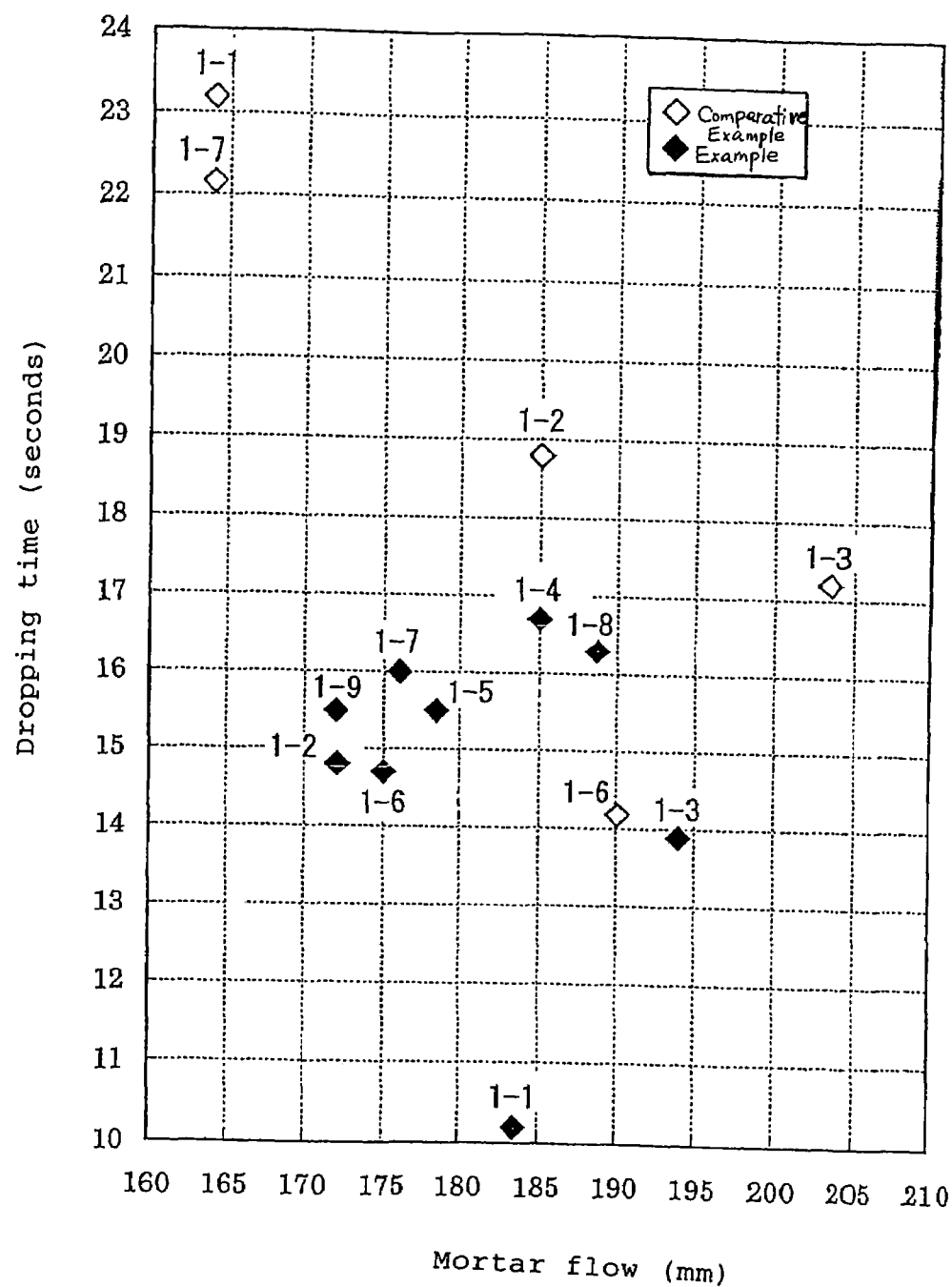
FIG. 2 is a graph showing the relationship between dropping time and mortar flow from the results in Table 4.

FIG. 2 shows a graph showing the relationship between dropping time and mortar flow from the results in Table 4.

TABLE 5

| | | Component (A) | Component (B) | (A)/(B) weight ratio | Dosage of (A) + (B) (weight-%) | Mortar flow (mm) | Dropping time (second) | State of aqueous solution |
|---|---|---|---|---|---|---|---|---|
| Example | 2-1 | a-2 | b-7 | 1/1 | 1.00 | 192 | 15.1 | ◎ |
| | 2-2 | a-3 | b-3 | 1/1 | 0.37 | 203 | 12.7 | ◎ |
| | 2-3 | a-3 | b-7 | 1/1 | 0.44 | 180 | 14.2 | ◎ |
| | 2-4 | a-3 | b-10 | 1/1 | 0.37 | 211 | 13.3 | ◎ |
| | 2-5 | a-3 | b-11 | 1/1 | 0.44 | 170 | 14.2 | ◎ |
| | 2-6 | a-3 | b-11 | 1/1.6 | 0.485 | 156 | 18.5 | ◎ |
| | 2-7 | a-3 | b-13 | 1/1 | 0.54 | 168 | 15.5 | ◎ |
| | 2-8 | a-3 | b-14 | 1/1 | 0.37 | 201 | 13.4 | ◎ |
| | 2-9 | a-3 | b-15 | 1/1.6 | 0.485 | 167 | 17.8 | ◎ |
| | 2-10 | a-3 | b-16 | 1/1 | 0.44 | 206 | 12.5 | ◎ |
| | 2-11 | a-3 | b-17 | 1/1 | 0.48 | 182 | 15.0 | ◎ |
| | 2-12 | a-4 | b-3 | 1/1 | 0.59 | 170 | 16.6 | ◎ |
| | 2-13 | a-6 | b-1 | 1/1 | 0.54 | 189 | 12.5 | ◎ |
| | 2-14 | a-6 | b-2 | 1/1 | 0.46 | 181 | 13.6 | ◎ |
| | 2-15 | a-6 | b-3 | 1/1 | 0.70 | 193 | 13.8 | ◎ |
| | 2-16 | a-6 | b-3 | 1/1 | 0.42 | 186 | 14.2 | ◎ |
| | 2-17 | a-6 | b-3 | 1/1 | 0.40 | 199 | 13.6 | ◎ |
| | 2-18 | a-6 | b-3 | 1/1 | 0.64 | 177 | 16.9 | ◎ |
| | 2-19 | a-6 | b-4 | 1/1 | 0.37 | 193 | 13.7 | ◎ |
| | 2-20 | a-6 | b-5 | 1/1 | 0.36 | 195 | 13.5 | ◎ |
| | 2-21 | a-6 | b-6 | 1/1 | 0.50 | 185 | 13.4 | ◎ |
| | 2-22 | a-6 | b-7 | 1/1 | 0.40 | 191 | 11.7 | ◎ |
| | 2-23 | a-6 | b-18 | 1/1 | 0.64 | 163 | 14.6 | ◎ |
| | 2-24 | a-9 | b-3 | 1/1 | 0.44 | 186 | 13.6 | ◎ |
| | 2-25 | a-5 | b-4 | 1/1 | 0.44 | 189 | 16.2 | ◎ |

TABLE 5-continued

|  |  | Component (A) | Component (B) | (A)/(B) weight ratio | Dosage of (A) + (B) (weight-%) | Mortar flow (mm) | Dropping time (second) | State of aqueous solution |
|---|---|---|---|---|---|---|---|---|
|  | 2-26 | a-6 | b-4 | 1/1 | 0.36 | 201 | 13.4 | ◎ |
|  | 2-27 | a-6 | b-19 | 1/1 | 0.28 | 212 | 13.3 | ◎ |
|  | 2-28 | a-6 | b-20 | 1/1 | 0.32 | 174 | 18.2 | ◎ |
|  | 2-29 | a-6 | b-21 | 1/1 | 0.40 | 174 | 15.8 | ◎ |
|  | 2-30 | a-20 | b-3 | 1/1 | 0.90 | 185 | 15.8 | ○ |
|  | 2-31 | a-21 | b-3 | 1/1 | 0.70 | 192 | 14.5 | ◎ |
|  | 2-32 | a-3/a-22 = 1/1 (weight ratio) | b-3 | 1/1 | 0.35 | 198 | 13.0 | ◎ |
|  | 2-33 | a-22 | b-3 | 1/1 | 0.31 | 195 | 13.3 | ○ |
|  | 2-34 | a-23 | b-3 | 1/1 | 0.65 | 193 | 13.2 | ◎ |
|  | 2-35 | a-23 | b-23 | 1/1 | 0.48 | 185 | 14.2 | ◎ |
|  | 2-36 | a-23 | b-24 | 1/1 | 0.65 | 190 | 13.7 | ◎ |
|  | 2-37 | a-3 | b-12 | 1/1 | 0.54 | 178 | 15.4 | ◎ |
|  | 2-38 | a-24 | b-16 | 1/1 | 0.50 | 184 | 14.0 | ◎ |
| Comparative example | 2-1 | (c-4) | — | — | 0.12 | 164 | 23.2 | ◎ |
|  | 2-2 | (c-4) | — | — | 0.13 | 185 | 18.8 | ◎ |
|  | 2-3 | (c-4) | — | — | 0.14 | 204 | 17.2 | ◎ |
|  | 2-4 | a-11 | b-1 | 1/1 | 1.00 | 114 | Not measurable | X |
|  | 2-5 | a-16 | b-3 | 1/1 | 1.00 | 105 | Not measurable | ◎ |

Figure 3:
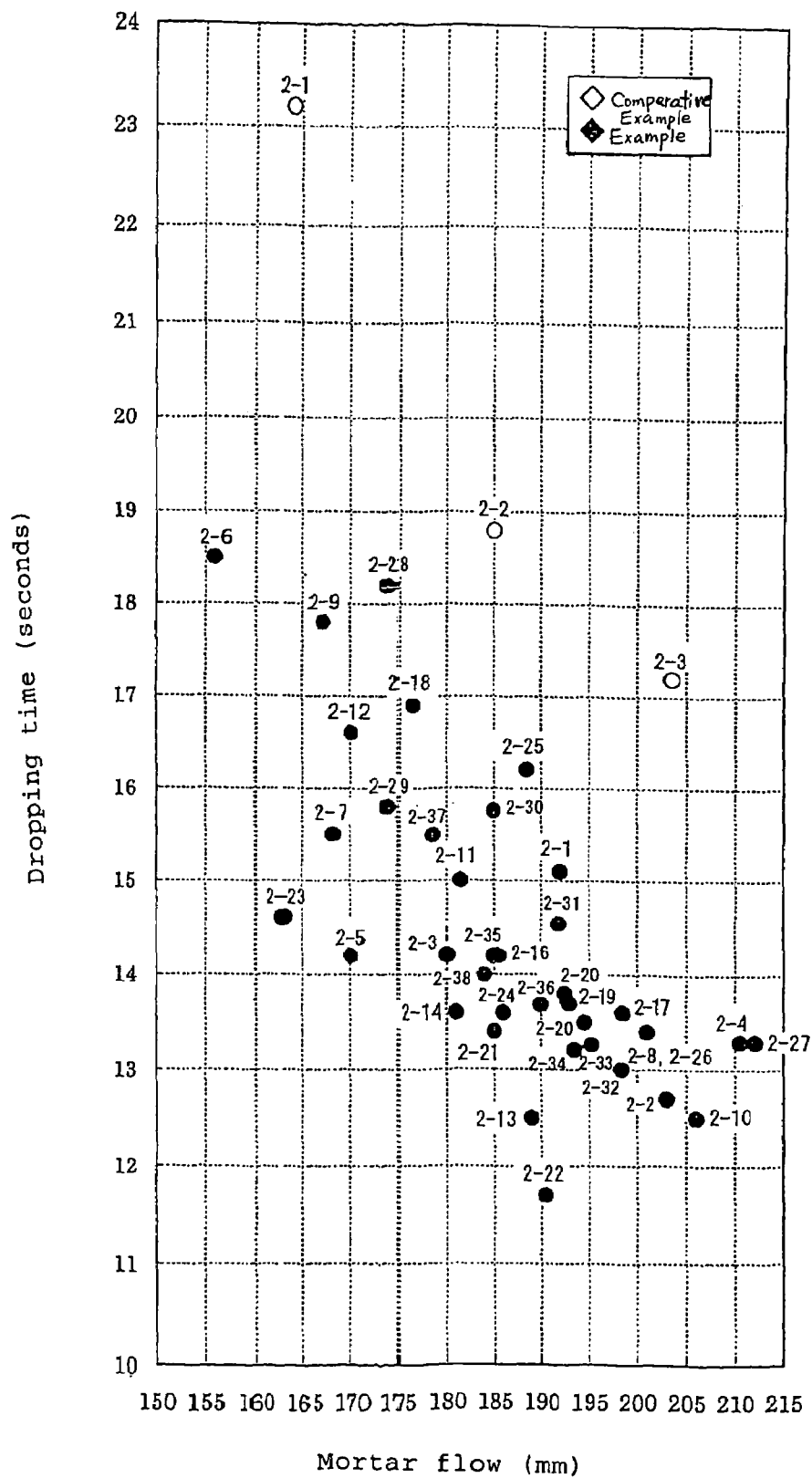
FIG. 3 is a graph showing the relationship between dropping time and mortar flow from the results in Table 5.

FIG. 3 shows a graph showing the relationship between dropping time and mortar flow from the results in Table 5.

TABLE 6

|  |  | Additive Composition (upper, type; lower, weight parts) | | | | | Dosage (weight-%) | Dropping time (second) | Mortar flow (mm) | | | | State of aqueous solution |
|---|---|---|---|---|---|---|---|---|---|---|---|---|---|
|  |  |  |  |  |  |  |  |  | Initial | After 30 minutes | After 60 minutes | After 90 minutes |  |
| Example | 3-1 | a-3 45 | b-8 10 | c-1 35 | c-2 10 | — | — | 0.22 | 13.0 | 183 | 182 | 197 | 174 | ◎ |
|  | 3-2 | a-3 45 | b-8 10 | c-1 20 | c-5 15 | c-2 10 | — | 0.24 | 13.4 | 178 | 185 | 221 | 208 | ◎ |
|  | 3-3 | a-9 45 | b-8 10 | c-1 35 | c-2 10 | — | — | 0.22 | 14.8 | 183 | 189 | 190 | 171 | ◎ |
|  | 3-4 | a-3 30 | b-9 7 | c-1 30 | c-3 13 | c-2 10 | d-1* 10 | 0.20 | 17.5 | 173 | 183 | 194 | 174 | ◎ |
|  | 3-5 | a-9 45 | b-8 10 | c-5 35 | c-2 10 | — | — | 0.25 | 14.9 | 164 | 163 | 184 | 188 | ◎ |
|  | 3-6 | a-13 58 | c-1 35 | c-3 6 | c-2 1 | — | — | 0.44 | 13.4 | 176 | 167 | 163 | 173 | ◎ |
|  | 3-7 | a-3 50 | b-8 12 | c-1 38 | — | — | — | 0.19 | 13.5 | 180 | 197 | 173 | 131 | ◎ |
| Comparative example | 3-1 | Mighty 3000S (Kao corporation) | | | | | | 0.18 | 21.2 | 174 | 177 | 176 | 167 | ◎ |
|  | 3-2 | Mighty 3000S (Kao corporation) | | | | | | 0.19 | 19.6 | 181 | 187 | 203 | 195 | ◎ |
|  | 3-3 | a-14 54 | c-1 10 | c-3 10 | c-2 8 | c-4 18 | — | 0.30 | 19.4 | 181 | 198 | 201 | 194 | ◎ |
|  | 3-4 | a-19 45 | b-8 10 | c-1 35 | c-2 10 | — | — | 0.20 | 18.5 | 181 | 195 | 180 | 175 | X |

*d-1: 20 wt % aqueous saccharose solution

TABLE 7

|  |  | Additive Composition* | | Dosage (weight-%) | Dropping time (second) | Mortar flow (mm) | | | |
|---|---|---|---|---|---|---|---|---|---|
|  |  |  |  |  |  | Initial | After 30 minutes | After 60 minutes | After 90 minutes |
| Example | 4-1 | a-17 70 | b-8 30 | 1.00 | 29.4 | 231 | 202 | 181 | 151 |
|  | 4-2 | a-18 70 | b-7 30 | 1.10 | 28.9 | 236 | 207 | 182 | 160 |
|  | 4-3 | a-18 70 | b-8 30 | 1.00 | 24.9 | 274 | 244 | 221 | 196 |
|  | 4-4 | a-18 70 | b-22 30 | 0.70 | 25.0 | 243 | 214 | 189 | 158 |

TABLE 7-continued

| | | Additive | | | | Dosage (weight-%) | Dropping time (second) | Mortar flow (mm) | | | |
|---|---|---|---|---|---|---|---|---|---|---|---|
| | | Composition* | | | | | | Initial | After 30 minutes | After 60 minutes | After 90 minutes |
| | 4-5 | a-18 70 | b-9 30 | — | — | 0.60 | 26.2 | 239 | 215 | 198 | 155 |
| | 4-6 | a-18 35 | b-8 15 | c-1 20 | c-4 30 | 0.70 | 25.5 | 258 | 260 | 255 | 252 |
| Comparative example | 4-1 | c-4 100 | | — | — | 0.31 | 34.7 | 230 | 198 | 182 | 150 |

*In the composition, type is shown in an upper section and weight part is shown in a lower section.

The dosage in Tables 4, 5, 6 and 7 indicates the total amount (wt %), based on cement, of the components (A), (B) and (C) and other components. The dosage in Table 7 is the amount thereof added to mortar used in measurement of mortar flow. To stabilize the air content in the hydraulic composition using the additive of the invention, a suitable antifoaming agent is preferably added. In Tables 4, 5, 6 and 7, therefore, an antifoaming agent was added as follows so that the amount of the air was reduced to 10 volume-% or less.

<Table 4>

(1) Examples 1-1 to 1-8, Comparative Examples 1-4 to 1-8

Silicone-based antifoaming agent Antifoam 013B (polyorganosiloxane manufactured by Dow Corning Asia Ltd.), 1.0% by weight (% by weight is based on cement; this applies hereinafter)

(2) Comparative Examples 1-1 to 1-3

Fatty ester-based antifoaming agent Foamlex 797 (Nicca Chemical Co., Ltd.), 0.5 wt %<

<Table 5>

(1) Examples 2-1 to 2-37, Comparative Examples 2-4 to 2-5

Silicone-based antifoaming agent Antifoam 013B (polyorganosiloxane-based agent manufactured by Dow Corning Asia Ltd.), 1.0 wt %

(2) Comparative Examples 2-1 to 2-3

Fatty ester-based antifoaming agent Foamlex 797 (Nicca Chemical Co., Ltd.), 0.5 wt %

<Table 6>

(1) Examples 3-1 to 3-7, Comparative Examples 3-3 to 3-4

Silicone-based antifoaming agent Antifoam 013B (polyorganosiloxane-based agent manufactured by Dow Corning Asia Ltd.), 0.5 wt %

(2) Examples 3-1 to 3-2

Fatty ester-based antifoaming agent Foamlex 797 (Nicca Chemical Co., Ltd.), 0.5 wt %

<Table 7>

(1) Examples 4-1 to 4-5

Silicone-based antifoaming agent antifoam 013B (polyorganosiloxane-based agent manufactured by Dow Corning Asia Ltd.), 1.0 wt %

(2) Example 4-6

Silicone-based antifoaming agent antifoam 013B (polyorganosiloxane-based agent manufactured by Dow Corning Asia Ltd.), 0.5 wt %

(3) Comparative Example 4-1

Fatty ester-based antifoaming agent Foamlex 797 (Nicca Chemical Co., Ltd.), 0.5 wt %

TABLE 8

| | | Additive | | | | | | Dosage (weight-%) | Anti-foaming agent Dosage (weight-%) | Concrete viscosity (W) | Concrete flow(mm) | | | Air content (%) | | | Difference in air content (%) | State of aqueous solution |
|---|---|---|---|---|---|---|---|---|---|---|---|---|---|---|---|---|---|---|
| | | Composition (upper, type; lower, weight parts) | | | | | | | | | Initial | After 30 minutes | After 60 minutes | Initial | After 30 minutes | After 60 minutes | | |
| Example | 5-1 | a-17 30 | b-9 7 | c-1 30 | c-3 13 | c-2 10 | d-1* 10 | 0.23 | 0.004 | 2.3 | 330 | 290 | 275 | 4.7 | 5.6 | 6.0 | 1.3 | ◎ |
| | 5-2 | a-17 30 | b-25 7 | c-1 30 | c-3 13 | c-2 10 | d-1* 10 | 0.23 | 0.004 | 2.5 | 340 | 310 | 285 | 5.0 | 5.5 | 5.8 | 0.8 | ◎ |
| | 5-3 | a-17 30 | b-26 7 | c-1 30 | c-3 13 | c-2 10 | d-1* 10 | 0.23 | 0.004 | 2.6 | 340 | 310 | 285 | 5.1 | 5.0 | 5.3 | 0.2 | ◎ |

TABLE 8-continued

| | | Additive Composition (upper, type; lower, weight parts) | | | | | | | Dosage (weight-%) | Anti-foaming agent Dosage (weight-%) | Concrete viscosity (W) | Concrete flow(mm) | | | Air content (%) | | | Difference in air content (%) | State of aqueous solution |
|---|---|---|---|---|---|---|---|---|---|---|---|---|---|---|---|---|---|---|---|
| | | | | | | | | | | | | Initial | After 30 minutes | After 60 minutes | Initial | After 30 minutes | After 60 minutes | | |
| | 5-4 | a-17 26 | b-27 13 | c-1 29 | c-3 12 | c-2 10 | d-1* 10 | | 0.26 | 0.004 | 2.5 | 340 | 310 | 290 | 4.0 | 3.9 | 3.9 | 0.1 | ◎ |
| | 5-5 | a-17 24 | b-27 12 | c-1 27 | c-3 11 | c-2 9 | d-1* 9 | e-1** 8 | 0.29 | 0.002 | 2.5 | 340 | 320 | 295 | 3.7 | 3.3 | 3.5 | 0.2 | ◎ |
| | 5-6 | a-24 34 | b-9 7 | c-1 29 | c-3 12 | c-2 9 | d-1* 9 | | 0.28 | 0.004 | 2.2 | 355 | 320 | 280 | 5.8 | 6.0 | 6.5 | 0.7 | ◎ |
| | 5-7 | a-24 31 | b-27 13 | c-1 27 | c-3 11 | c-2 9 | d-1* 9 | | 0.31 | 0.004 | 2.2 | 350 | 310 | 280 | 5.8 | 5.6 | 5.6 | 0.2 | ◎ |
| | 5-8 | a-24 34 | b-16 7 | c-1 29 | c-3 12 | c-2 9 | d-1* 9 | | 0.28 | 0.004 | 2.3 | 350 | 290 | 240 | 6.0 | 6.5 | 6.7 | 0.7 | ◎ |
| | 5-9 | a-24 31 | b-16 7 | c-1 27 | c-3 11 | c-2 8 | d-1* 8 | e-1** 8 | 0.31 | 0.002 | 2.2 | 345 | 295 | 250 | 4.9 | 5.4 | 5.5 | 0.6 | ◎ |
| | 5-10 | a-24 31 | b-28 13 | c-1 27 | c-3 11 | c-2 9 | d-1* 9 | | 0.31 | 0.004 | 2.2 | 350 | 285 | 255 | 5.5 | 5.3 | 5.4 | 0.1 | ◎ |
| | 5-11 | a-24 30 | b-28 12 | c-1 25 | c-3 10 | c-2 8 | d-1* 8 | e-1** 7 | 0.32 | 0.002 | 2.2 | 340 | 280 | 245 | 4.5 | 4.3 | 4.3 | 0.2 | ◎ |
| Comparative example | 5-1 | Mighty 3000S (Kao corporation) | | | | | | | 0.90 | 0.004 | 4.3 | 350 | 390 | 365 | 4.5 | 3.2 | 4.9 | 0.4 | ◎ |

The dosage in Table 8 indicates the total amount (wt %), based on cement, of the components (A), (B) and (C) and other components. The dosage of the antifoaming agent is weight-% based on cement. The difference in the air content is (initial air content (%))−(the air content after 60 minutes). The other components are as follows:
*d-1: 20 wt % saccharose solution
**e-1: 20 wt % naphthalene sulfonic acid/formalin condensate, sodium solution (Kao Corporation)

TABLE 9

| | | Additive Composition (upper, type; lower, weight parts) | | | | | | | Dosage (weight-%) | Antifoaming agent Dosage (weight-%) | Concrete viscosity (W) | Concrete flow(mm) | | |
|---|---|---|---|---|---|---|---|---|---|---|---|---|---|---|
| | | | | | | | | | | | | Initial | After 30 minutes | After 60 minutes |
| Example | 6-1 | a-2 30 | b-9 7 | c-1 30 | c-3 13 | c-2 10 | d-1* 10 | | 0.28 | 0.004 | 2.3 | 335 | 295 | 280 |
| | 6-2 | a-2 27 | b-9 6 | c-1 27 | c-3 12 | c-2 9 | d-1* 9 | f-1** 10 | 0.31 | 0.001 | 2.1 | 340 | 300 | 280 |
| | 6-3 | a-2 27 | b-9 6 | c-1 27 | c-3 12 | c-2 9 | d-1* 9 | f-2** 10 | 0.31 | 0.001 | 2.3 | 340 | 305 | 280 |
| | 6-4 | a-2 28 | b-9 7 | c-1 28 | c-3 12 | c-2 10 | d-1* 10 | f-3** 5 | 0.29 | 0.001 | 2.0 | 350 | 310 | 290 |
| | 6-5 | a-2 24 | b-9 6 | c-1 24 | c-3 10 | c-2 8 | d-1* 8 | f-4** 20 | 0.34 | 0.0005 | 2.3 | 340 | 305 | 285 |
| | 6-6 | a-2 28 | b-9 7 | c-1 28 | c-3 12 | c-2 10 | d-1* 10 | f-5** 5 | 0.29 | 0.001 | 2.1 | 345 | 310 | 295 |

| | | Air content (%) | | | Difference in air content (%) | Maximum solid concentration (weight-%) | State of aqueous solution |
|---|---|---|---|---|---|---|---|
| | | Initial | After 30 minutes | After 60 minutes | | | |
| Example | 6-1 | 5.3 | 5.5 | 5.6 | 0.3 | 23 | ◎ |
| | 6-2 | 5.1 | 5.2 | 5.3 | 0.2 | 22 | ◎ |

TABLE 9-continued

|  |  |  |  |  |  |  |
|---|---|---|---|---|---|---|
| 6-3 | 5.5 | 5.6 | 5.8 | 0.3 | 22 | ◎ |
| 6-4 | 5.0 | 5.2 | 5.2 | 0.2 | 20 | ◎ |
| 6-5 | 4.8 | 5.0 | 5.2 | 0.4 | 20 | ◎ |
| 6-6 | 4.6 | 4.7 | 4.7 | 0.1 | 23 | ◎ |

The dosages of additives, shown in Table 9, indicate the total amount (wt %), based on cement, of components (A), (B) and (C) and other components. The dosage of the antifoaming agent is weight-% based on cement. The maximum solid concentration is such a maximum concentration that substantially no separation happens with each additive component, which is preferred to be not less than 10% by weight. The other components are:
**d-1: 20 wt % saccharose solution
**f-1 to f-4: shown in Table 10

TABLE 10

| No | Carboxylic acid polymer salt** | Mw |
|---|---|---|
| f-1 | Sodium polyacrylate | 5000 |
| f-2 | Potassium acrylate/Potassium maleate(9/1) copolymer | 25000 |
| f-3 | Olefin(carbon atoms 5)/Sodium maleate(5/5) copolymer | 20000 |
| f-4 | Isobutylene/Sodium maleate(5/5) copolymer | 60000 |
| f-5 | ATBS*/Sodium maleate(7/3) copolymer | 10000 |

*ATSB: 2-acrylamide-2-methylpropane sulfonate, sodium
**Monomer ratio is molar ratio

The invention claimed is:

1. An additive for hydraulic compositions comprising:
an antifoaming agent; and
a phosphoric monoester having a group represented by general formula (1) below or a salt thereof (referred to hereinafter as the monoester) and a phosphoric diester (including a pyrophosphoric diester) having a group represented by the general formula (1) below or a salt thereof (referred to hereinafter as the diester):

$$R^1—O(AO)_n— \quad (1)$$

wherein $R^1$ represents a C8 to C22 alkyl or alkenyl group or a hydrocarbon group having two or more benzene rings, AO represents a C2 to C4 oxyalkylene group, and n is a number of 1 to 50 as the average added mole number,
wherein the monoester weight content ranges from 0.4 to 0.95 in terms of monoester/(monoester+diester).

2. The additive for hydraulic compositions according to claim 1, which further comprises at least one compound selected from the group consisting of (B1) a nonionic compound having a C8 to C26 alkyl or alkenyl group or a C6 to C35 hydrocarbon group having one or more benzene rings and a polyoxyalkylene group comprising a C2 to C4 oxyalkylene group wherein the average added mole number is 3 to 400 and (B2) an ionic compound having a C8 to C26 alkyl or alkenyl group or a C6 to C35 hydrocarbon group having one or more benzene rings and a polyoxyalkylene group comprising a C2 to C4 oxyalkylene group wherein the average added mole number is 5 to 400, the ionic compound (B2) excluding the phosphate having the group represented by the general formula (1) in claim 1 or a salt thereof.

3. The additive for hydraulic compositions according to claim 2, wherein the nonionic compound is at least one compound selected from the group consisting of a compound represented by the general formula (2), a compound represented by the general formula (3) and a compound represented by the general formula (4):

$$R^2—O-(AO)_p—R \quad (2)$$

$$R^3—COO-(AO)_q—R^4 \quad (3)$$

$$R^5—NH_{(2-t)}[(AO)_s—H]_t \quad (4)$$

wherein $R^2$, $R^3$ and $R^5$ each represent a C8 to C26 alkyl or alkenyl group or a C6 to C35 hydrocarbon group having one or more benzene rings, R and $R^4$ each represent a hydrogen atom, a C1 to C26 alkyl or alkenyl group or a C6 to C35 hydrocarbon group having one or more benzene rings, AO represents a C2 to C4 oxyalkylene group, p, q and s each represent an average number of molecules added, which is a number of 3 to 400, and t is 1 or 2.

4. The additive for hydraulic compositions according to any one of claims 1 to 3, which further comprises a copolymer having at least one structural unit selected from a structural unit derived from a monomer represented by general formula (5):

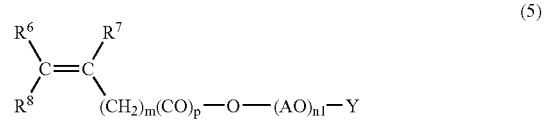
(5)

wherein $R^6$ and $R^7$ each represent a hydrogen atom or methyl group, m is a number of 0 to 2, $R^8$ represents a hydrogen atom or $—COO(AO)_{n1}Y$, p is a number of 0 or 1, AO represents a C2 to C4 oxyalkylene group or an oxystyrene group, n1 is a number of 1 to 300 that is the average added mole number, and Y represents a hydrogen atom or a C1 to C18 alkyl or alkenyl group,
a structural unit derived from a monomer represented by general formula (6) and a structural unit derived from a monomer represented by general formula (7):

(6)

(7)

wherein $R^9$ to $R^{11}$ each represent a hydrogen atom, methyl group or $—(CH_2)_{m1}COOM^2$, which may form an anhydride together with $—COOM^1$ or another $—(CH_2)_{m1}COOM^2$, where $M^1$ and $M^2$ are not present, $M^1$ and $M^2$ each represent a hydrogen atom, an alkali metal, an alkaline earth metal, an ammonium group, an alkyl ammonium group or a hydroxyl-substituted alkyl ammonium group, and m1 is a number of 0 to 2, X: $SO_3Z$ or 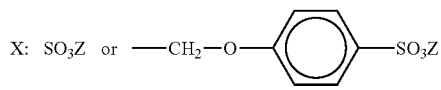

wherein Z represents a hydrogen atom, an alkali metal, an alkaline earth metal, an ammonium group, an alkyl ammonium group or a hydroxyl-substituted alkyl ammonium group.

5. The additive for hydraulic compositions according to claim 1, in which each of the monoester and the diester comprises a compound represented by the formula(1-1):

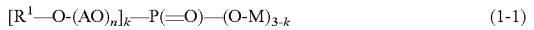
(1-1)

wherein $R^1$ represents a C8 to C22 alkyl or alkenyl group or a hydrocarbon group having two or more benzene rings, AO represents a C2 to C4 oxyalkylene group, n is an average added mole number of 1 to 50, k is 1 or 2, and M represents a hydrogen atom, an alkali metal, an alkaline earth metal, an ammonium group, an alkyl ammonium group or a hydroxyl-substituted alkyl ammonium group.

6. A hydraulic composition comprising an additive for hydraulic compositions, hydraulic powder and water;
said additive for hydraulic compositions comprising a phosphoric monoester having a group represented by general formula (1) below or a salt thereof (referred to hereinafter as the monoester) and a phosphoric chester (including a pyrophosphoric diester) having a group represented by the general formula (1) below or a salt thereof (referred to hereinafter as the diester):

(1)

wherein $R^1$ represents a C8 to C22 alkyl or alkenyl group or a hydrocarbon group having two or more benzene rings. AO represents a C2 to C4 oxyalkylene group, and n is a number of 1 to 50 as the average added mole number, wherein the monoester weight content ranges from 0.4 to 0.95 in terms of monoester/(monoester+diester).

7. The hydraulic composition according to claim 6, which comprises the monoester and the diester in the total amount of 0.01 to 7.5 parts by weight based on 100 parts by weight of the hydraulic powder.

8. A set product obtained from the hydraulic composition described in claim 6 or 7.

9. A method of dispersing a hydraulic composition by adding the additive described in claim 1 to a hydraulic composition.

10. The hydraulic composition according to claim 6, wherein said additive for hydraulic compositions further comprises an antifoaming agent.

* * * * *